(12) United States Patent
Shiro et al.

(10) Patent No.: US 12,549,859 B2
(45) Date of Patent: *Feb. 10, 2026

(54) OMNIDIRECTIONAL CAMERA SYSTEM WITH IMPROVED POINT OF INTEREST SELECTION

(71) Applicant: Ricoh Company, Ltd., Tokyo (JP)

(72) Inventors: Hideki Shiro, Kanagawa (JP);
Kenichiro Morita, Tokyo (JP);
Hidekuni Annaka, Saitama (JP);
Takeshi Homma, Kanagawa (JP);
Takuya Soneda, Kanagawa (JP);
Tomonori Aikawa, Kanagawa (JP);
Takafumi Takeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,279

(22) Filed: Mar. 15, 2024

(65) Prior Publication Data

US 2024/0223904 A1 Jul. 4, 2024

Related U.S. Application Data

(60) Division of application No. 17/537,483, filed on Nov. 30, 2021, now Pat. No. 11,956,547, which is a
(Continued)

(30) Foreign Application Priority Data

Mar. 15, 2019 (JP) .................................. 2019-049128

(51) Int. Cl.
*H04N 23/698* (2023.01)
*G06T 3/12* (2024.01)
(Continued)

(52) U.S. Cl.
CPC ............. *H04N 23/698* (2023.01); *G06T 3/12* (2024.01); *H04N 1/00129* (2013.01);
(Continued)

(58) Field of Classification Search
None
See application file for complete search history.

(56) References Cited

U.S. PATENT DOCUMENTS

2016/0269632 A1  9/2016  Morioka
2017/0244946 A1  8/2017  Matias et al.
(Continued)

FOREIGN PATENT DOCUMENTS

JP   2014-131215 A   7/2014
JP   2016-167739 A   9/2016
JP   2017-108358 A   8/2017

OTHER PUBLICATIONS

Japanese Office Action issued Nov. 7, 2023, in corresponding Japanese Patent Application No. 2022-196234, 9 pages.
U.S. Appl. No. 16/519,216, filed Jul. 23, 2019, Yohhei Ohmura, et al.

*Primary Examiner* — Paul M Berardesca
(74) *Attorney, Agent, or Firm* — XSENSUS LLP

(57) ABSTRACT

An image capturing device includes an imaging device and circuitry. The imaging device captures an image. The circuitry defines a point of interest in the image, converts the defined point of interest in accordance with attitude information of the image capturing device, and cuts out a viewable area from the image. The viewable area includes the converted point of interest.

15 Claims, 33 Drawing Sheets

Related U.S. Application Data continuation of application No. 16/785,658, filed on Feb. 10, 2020, now Pat. No. 11,206,351.

(51) Int. Cl.

| | | |
|---|---|---|
| *H04N 1/00* | (2006.01) |
| *H04N 7/18* | (2006.01) |
| *H04N 13/117* | (2018.01) |
| *H04N 13/282* | (2018.01) |
| *H04N 13/354* | (2018.01) |
| *H04N 23/45* | (2023.01) |
| *H04N 23/80* | (2023.01) |
| *H04N 23/951* | (2023.01) |
| *H04N 101/00* | (2006.01) |

(52) U.S. Cl.
CPC ......... *H04N 1/00458* (2013.01); *H04N 7/181* (2013.01); *H04N 13/117* (2018.05); *H04N 13/282* (2018.05); *H04N 13/354* (2018.05); *H04N 23/45* (2023.01); *H04N 23/80* (2023.01); *H04N 23/951* (2023.01); *H04N 2101/00* (2013.01); *H04N 2201/0084* (2013.01)

(56) References Cited

U.S. PATENT DOCUMENTS

| | | | |
|---|---|---|---|
| 2018/0052576 A1* | 2/2018 | Lee | G06F 3/04883 |
| 2018/0084197 A1 | 3/2018 | Lee et al. | |
| 2018/0097682 A1 | 4/2018 | Yoshida et al. | |
| 2018/0098105 A1 | 4/2018 | Morita et al. | |
| 2018/0122130 A1 | 5/2018 | Kim et al. | |
| 2018/0191787 A1 | 7/2018 | Morita et al. | |
| 2018/0227457 A1 | 8/2018 | Morita et al. | |
| 2018/0343388 A1 | 11/2018 | Matsushita | |
| 2019/0005609 A1 | 1/2019 | Kato | |
| 2019/0082144 A1 | 3/2019 | Hakata et al. | |
| 2019/0098211 A1 | 3/2019 | Ohmura et al. | |
| 2019/0098253 A1 | 3/2019 | Soneda et al. | |
| 2019/0306004 A1 | 10/2019 | Hakata et al. | |
| 2019/0306201 A1 | 10/2019 | Ohmura et al. | |
| 2019/0306421 A1 | 10/2019 | Takeda et al. | |
| 2019/0306458 A1 | 10/2019 | Soneda et al. | |
| 2020/0213520 A1* | 7/2020 | Shoda | G11B 27/34 |
| 2020/0296284 A1 | 9/2020 | Aikawa et al. | |
| 2020/0366839 A1 | 11/2020 | Kawasaki | |
| 2021/0176409 A1 | 6/2021 | Tanaka et al. | |

* cited by examiner

FIG. 15A
FIG. 15 | FIG. 15A |
        | FIG. 15B |
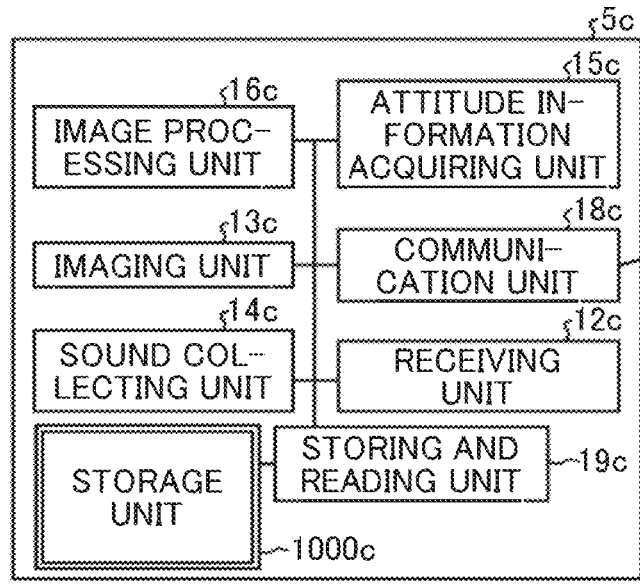
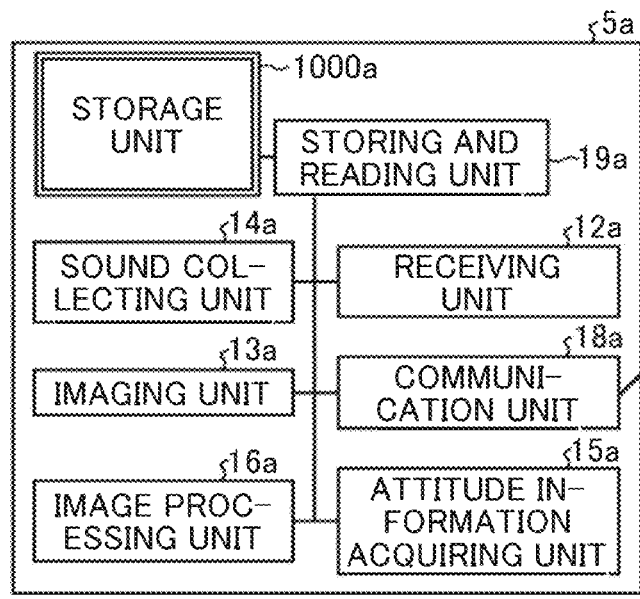

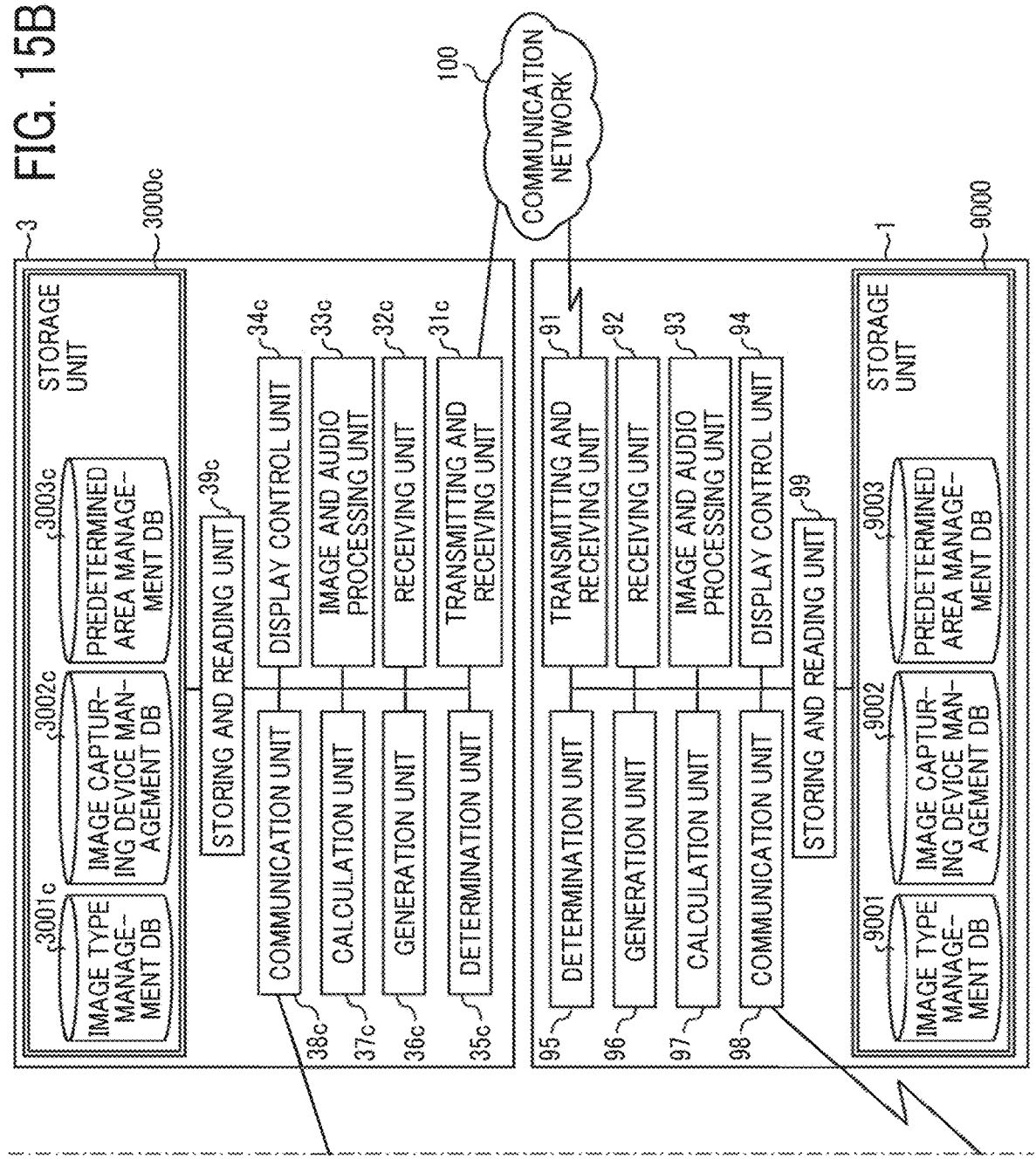

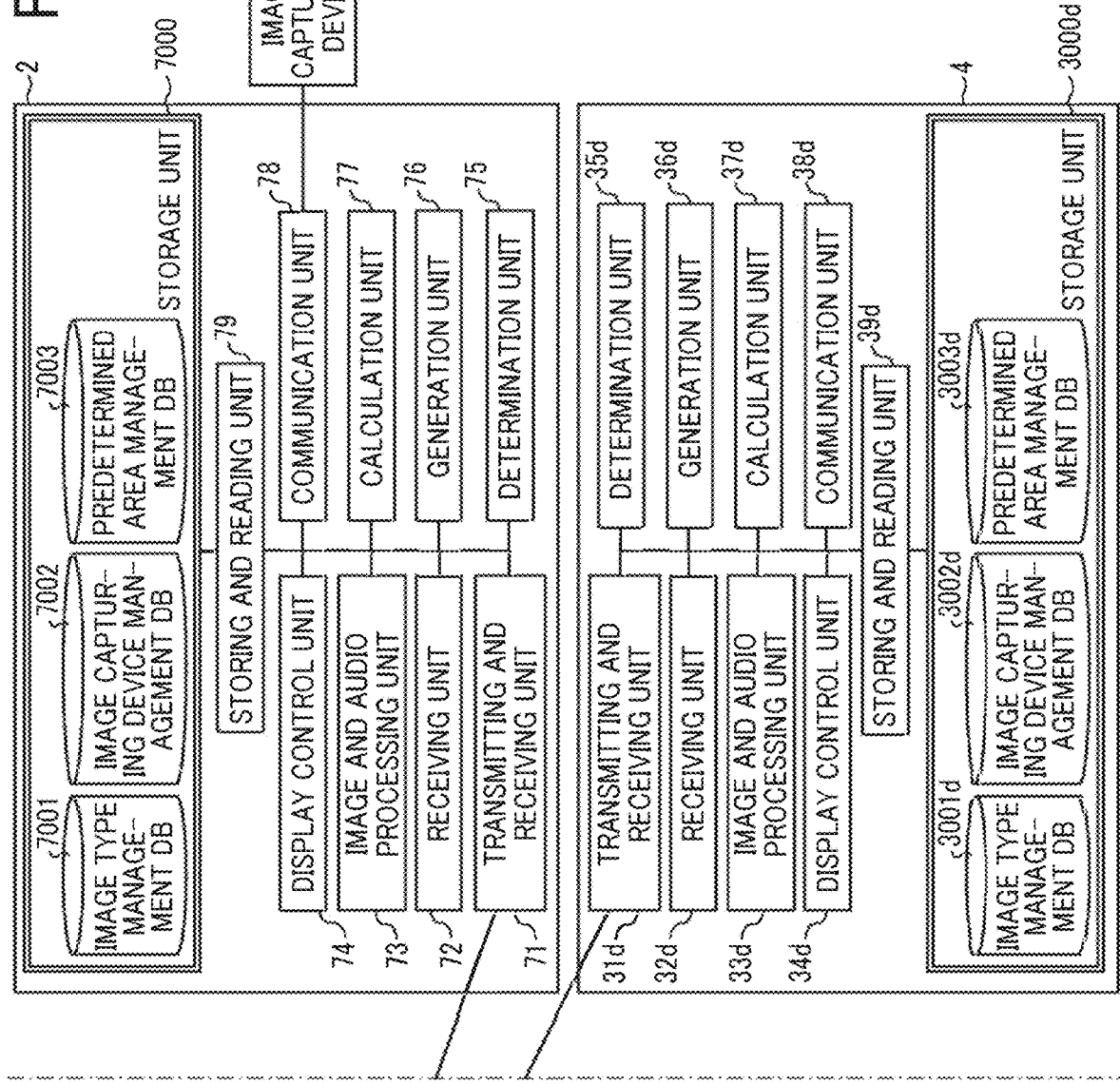

FIG. 17

| IMAGE DATA ID | IP ADDRESS OF TRANSMITTER TERMINAL | SOURCE NAME (IMAGE TYPE INFORMATION) |
|---|---|---|
| RS001 | 1.2.1.3 | Video_Wide |
| RS002 | 1.2.2.3 | Video_Wide |
| RS003 | 1.3.1.3 | Video |
| RS004 | 1.3.2.3 | Video |

FIG. 18

| VENDOR ID AND PRODUCT ID INCLUDED IN GUIDS OF IMAGE CAPTURING DEVICE |
|---|
| vid_05ca&pid_2711 |
| vid_05ca&pid_3822 |
| ... |

FIG. 19

| IP ADDRESS OF TERMINAL THAT TRANSMITS IMAGE | IP ADDRESS OF TERMINAL THAT RECEIVES IMAGE (TERMINAL THAT TRANSMITS PREDETERMINED AREA INFORMATION) | PREDETERMINED AREA INFORMATION | | |
|---|---|---|---|---|
| | | RADIUS VECTOR (r) | POLAR ANGLE (θ) | AZIMUTH (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 20

| SESSION ID | IP ADDRESSES OF PARTICIPANT TERMINALS |
|---|---|
| se101 | 1.2.1.3, 1.2.2.3, 1.3.1.3 |
| se102 | 1.2.1.3, 1.2.2.3, 1.3.1.3 |
| ... | ... |

FIG. 21

| SESSION ID | IMAGE DATA ID | IP ADDRESS OF TRANSMITTER TERMINAL | SOURCE NAME (IMAGE TYPE INFORMATION) |
|---|---|---|---|
| se101 | RS001 | 1.2.1.3 | Video_Wide |
| se101 | RS002 | 1.2.2.3 | Video |
| se101 | RS003 | 1.3.1.3 | Video_Wide |
| se102 | RS004 | 1.2.1.4 | Video |
| se102 | RS005 | 1.3.1.4 | Video_Wide |
| ... | ... | ... | ... |

FIG. 22

| IP ADDRESS OF TERMINAL THAT TRANSMITS IMAGE | IP ADDRESS OF TERMINAL THAT RECEIVES IMAGE | PREDETERMINED AREA INFORMATION | | |
|---|---|---|---|---|
| | | RADIUS VECTOR (r) | POLAR ANGLE (θ) | AZIMUTH (φ) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | ... | ... | ... |

| COORDINATE VALUES AFTER CONVERSION | | COORDINATE VALUES BEFORE CONVERSION | |
|---|---|---|---|
| θ (pix) | φ (pix) | x(pix) | y(pix) |
| 0 | 0 | | |
| 1 | 1 | | |
| ⋮ | ⋮ | ⋮ | ⋮ |
| 3598 | 1798 | | |
| 3599 | 1799 | | |

OMNIDIRECTIONAL CAMERA SYSTEM WITH IMPROVED POINT OF INTEREST SELECTION

CROSS-REFERENCE TO RELATED APPLICATIONS

This application is a divisional of U.S. application Ser. No. 17/537,483, filed November 30, 2021, which is a continuation of U.S. application Ser. No. 16/785,658, filed Feb. 10, 2020 (now U.S. Pat. No. 11,206,351), which is based on and claims priority pursuant to 35 U.S.C. § 119(a) to Japanese Patent Application No. 2019-049128 filed on Mar. 15, 2019 in the Japan Patent Office, the entire disclosure of each is hereby incorporated by reference herein.

BACKGROUND

Technical Field

The present invention relates to an image capturing device, an image processing system, and an image processing method.

Description of the Related Art

There is an image capturing device that captures a 360-degree, all-directional (hereinafter referred to as omnidirectional) image of surroundings at one time with a plurality of wide-angle lenses such as fisheye lenses or ultrawide-angle lenses. The image capturing device generates the omnidirectional image by projecting images from the respective lenses onto imaging elements and combining the projected images through image processing. For example, the image capturing device generates the omnidirectional image by capturing the image of an omnidirectional subject with two wide-angle lenses each having an angle of view exceeding 180 degrees.

Whereas the omnidirectional image generated by the image capturing device is expressed in a spherical coordinate system, a typical display has a planar surface and thus has difficulty in displaying the entire omnidirectional image at one time. To display the omnidirectional image, therefore, a dedicated viewer application is normally used to convert a part of the omnidirectional image with a certain angle of view into an image suitable for the typical display.

There is a technique of determining a point of interest to enable a terminal to display a part of the omnidirectional image with a given angle of view. According to the technique, in response to tilting or rotation of the image capturing device by a user, the point of interest is changed, and the changed point of interest is displayed on the typical display.

SUMMARY

In one embodiment of this invention, there is provided an improved image capturing device that includes, for example, an imaging device and circuitry. The imaging device captures an image. The circuitry defines a point of interest in the image, converts the defined point of interest in accordance with attitude information of the image capturing device, and cuts out a viewable area from the image. The viewable area includes the converted point of interest.

In one embodiment of this invention, there is provided an improved image processing system that includes, for example, circuitry. The circuitry acquires an image captured by an image capturing device, defines a point of interest in the image, converts the defined point of interest in accordance with attitude information of the image capturing device, cuts out, from the image, a viewable area including the converted point of interest, and displays, in a display area of a display, the viewable area cut out from the image and including the converted point of interest.

In one embodiment of this invention, there is provided an improved image processing method that includes, for example, acquiring an image captured by an image capturing device, acquiring attitude information of the image capturing device, converting a defined point of interest in accordance with the attitude information, cutting out, from the image, a viewable area including the converted point of interest, and displaying, in a display area of a display, the viewable area cut out from the image and including the converted point of interest.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 15A, 15B (FIG. 15), 16A, and 16B (FIG. 16) are functional block diagrams illustrating exemplary functional blocks of the image communication system;

FIG. 17 is a conceptual diagram illustrating an image type management table stored in a communication terminal of the image communication system;

FIG. 18 is a conceptual diagram illustrating an image capturing device management table stored in the communication terminal;

FIG. 19 is a conceptual diagram illustrating a predetermined area information management table stored in the communication terminal;

FIG. 20 is a conceptual diagram illustrating a session management table stored in the communication management system;

FIG. 21 is a conceptual diagram illustrating an image type management table stored in the communication management system;

FIG. 22 is a conceptual diagram illustrating a predetermined area information management table stored in the communication management system;

Figure 1:
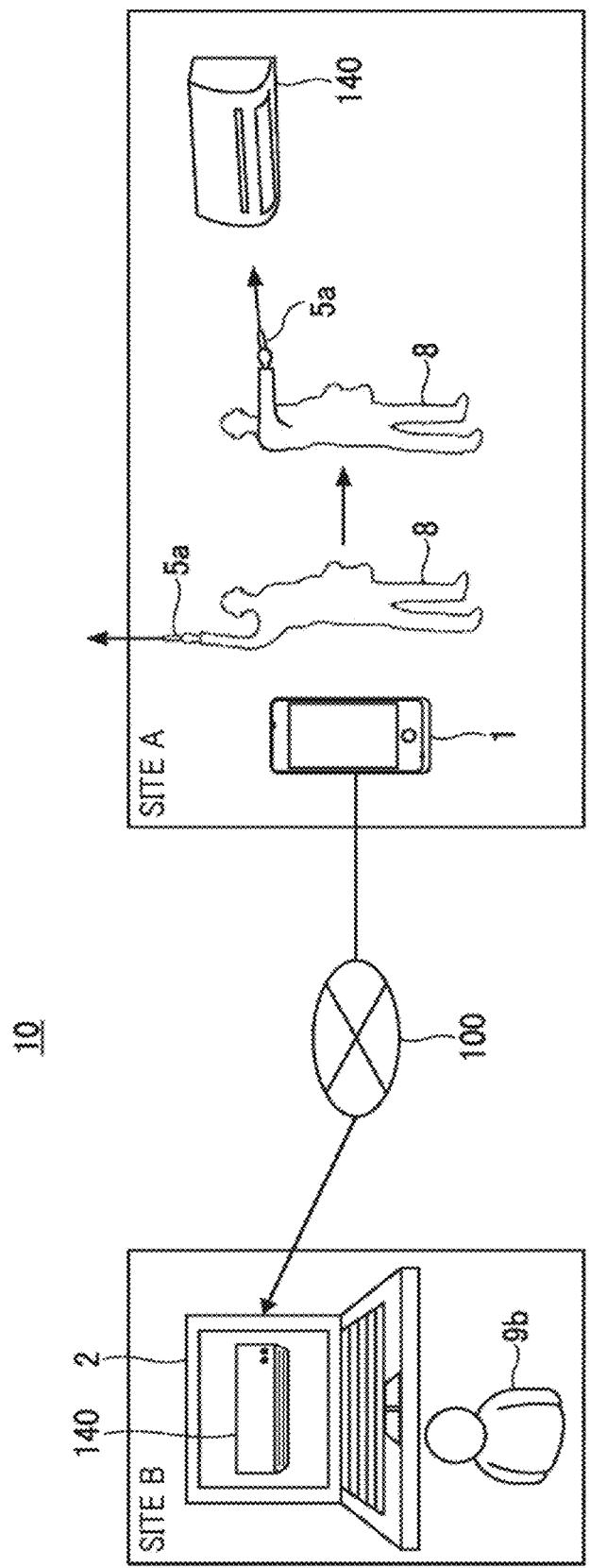
FIG. 1 is a diagram illustrating a schematic operation of an image communication system of an embodiment of the present invention to transmit from one site to another site an omnidirectional image with a point of interest specified in a given direction.
Figure 2:
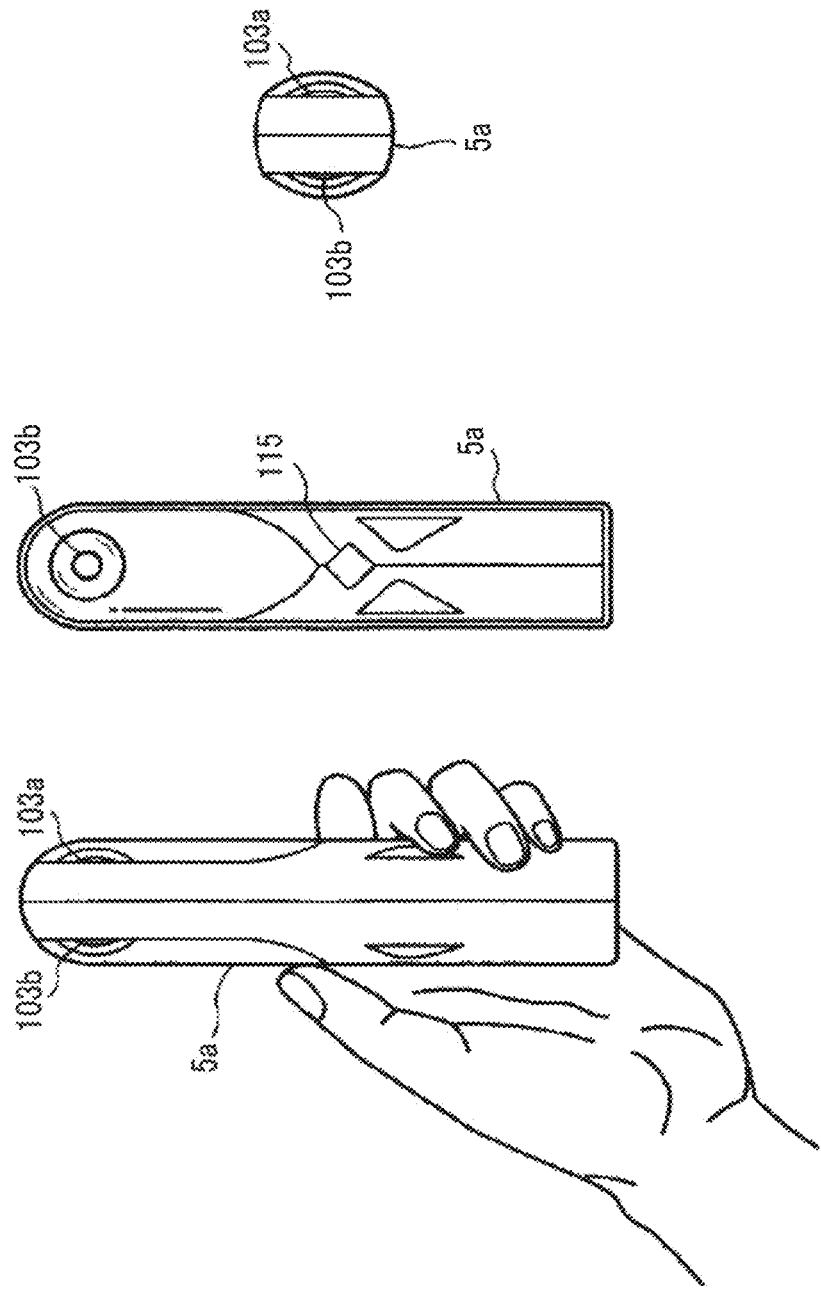
FIG. 2A is a right side view of an image capturing device included in the image communication system.
FIG. 2B is a front view of the image capturing device.
FIG. 2C is a plan view of the image capturing device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As described above, the existing technique changes the point of interest in response to tilting or rotation of the image capturing device by a user. According to the technique, however, it is difficult for the user of the image capturing device (i.e., a photographer) to specify the point of interest in real time. The photographer may want to specify the point of interest in real time in some situations such as in viewing of real estate properties, for example.

When applied to viewing of real estate properties, the image capturing device is capable of capturing the image of the entire interior of a property, enabling an interested client to grasp a general idea of the property without physically visiting the property and thus save time and trouble for transportation.

For example, viewing of a real estate property may proceed as follows. A real estate agent visits the property and captures the image of the property with the image capturing device. Using a communication terminal, an interested client at a remote site receives and views, in real time, the image of the property captured by the image capturing device. As well as the image, sound is transmitted to the communication terminal of the client, enabling the client to view the property while conversing with the agent.

The image transmitted to the communication terminal of the client, however, is limited to a part of the omnidirectional image with a certain angle of view. Therefore, the client is not necessarily watching a part of the omnidirectional image being explained by the agent. Further, it is difficult to immediately display the part on a flat-surface device. Consequently, the client is confused about which part of the omnidirectional image is to be looked at. For instance, when the agent inside the property says "This room is equipped with this latest model of air-conditioner," the client viewing from the remote site is not necessarily looking in the direction of the air-conditioner in the omnidirectional image, making it difficult for both the agent and the client to well communicate on the point of interest specified in real time.

To address this issue, the agent may display a preview of the omnidirectional image on a communication terminal of the agent and perform an operation of specifying the point of interest, to thereby transmit the data of the point of interest from the communication terminal of the agent to the communication terminal of the client viewing from the remote site such that the agent and the client share the same point of interest. However, it is difficult for the agent to operate the communication terminal while capturing the image with the image capturing device, particularly when the number of agents available is limited to one.

There is also a technique of estimating the point of interest by analyzing the omnidirectional image. The technique, however, is based on the estimation of the point of interest, and thus the part to be explained by the agent is not necessarily estimated as the point of interest.

The present invention provides an image processing system enabling the photographer to specify the point of interest in real time.

An image processing system according to an embodiment of the present invention and an image processing method executed by the image processing system will be described below with reference to the drawings.

A schematic operation of an image communication system 10 (e.g., an example of the image processing system) will first be described with FIG. 1.

FIG. 1 is a diagram illustrating a schematic operation of the image communication system 10 to transmit from a site A to a site B an omnidirectional image with a point of interest specified in a given direction.

The coordinates of the point of interest are previously defined in an image capturing device 5*a* according to the embodiment. For example, the coordinates of the point of interest are expressed as (x, y), which represent pixels or an area of an imaging element of the image capturing device 5*a* corresponding to the image of a subject located on the upper side in the longitudinal direction of the image capturing device 5*a*. The coordinates of the point of interest are coordinates on the imaging element, and are preset in a shipment process of the image capturing device 5*a*.

When a photographer 8 at the site A wants a user 9*b* at the site B to pay attention to an air-conditioner 140, the photographer 8 points the upper side in the longitudinal direction of the image capturing device 5*a* at the air-conditioner 140. The image capturing device 5*a* constantly acquires attitude information for later-described zenith correction. The image capturing device 5*a* captures the omnidirectional image and performs the zenith correction based on the attitude information. Therefore, the image capturing device 5*a* does not capture the image of the air-conditioner 140 at an angle. Further, the image of the air-conditioner 140 is on the coordinates of the point of interest, i.e., the air-conditioner 140 is a subject aligned with the coordinates of the point of interest. The attitude information represents how the coordinates of the point of interest are changed by tilting of the image capturing device 5*a* by the photographer 8. With the zenith correction, therefore, the coordinates of the point of interest converted from the defined coordinates of the point of interest are identified.

Via a communication terminal 1 and a communication network 100, the image capturing device 5*a* transmits the omnidirectional image and the converted coordinates of the point of interest to a communication terminal 2 at the site B.

The communication terminal 2 then generates a predetermined area image by cutting out from the omnidirectional image a predetermined area including the coordinates of the point of interest and displays the generated predetermined area image on a display, for example, irrespective of the predetermined area image displayed by the communication terminal 2 until the receipt of the omnidirectional image and the coordinates of the point of interest, Thereby, the photographer 8 is able to draw the attention of the user 9*b* to the object to which the photographer 8 wants the user 9*b* to pay attention. Further, a viewer (i.e., the user 9*b*) is unable to change, for at least a certain time, the predetermined area image generated based on point-of-interest information including the coordinates of the point of interest. That is, the predetermined area image generated based on the point-of-interest information is forcibly displayed.

As described above, according to the image communication system 10 of the embodiment, the coordinates of the point of interest are previously defined in the image capturing device 5*a*. When the photographer 8 points the image capturing device 5*a* at the target object such that the coordinates of the point of interest are aligned with the target object, the coordinates of the point of interest are converted in accordance with the attitude information, and the converted coordinates of the point of interest are transmitted to the user 9*b*. Consequently, the photographer 8 is able to draw the attention of the user 9*b* at the site B to the point of interest in real time.

As described above, the defined point of interest refers to a point or area on the imaging element. The subject photographed by the image capturing device 5*a* is constantly located in the same direction as viewed from the image capturing device 5*a*. In the present embodiment, the defined point of interest is set to pixels or an area on the imaging element corresponding to the image of the subject located on the upper side in the longitudinal direction of the image capturing device 5*a*. The point of interest, however, may be set to a desired area. For example, the point of interest may be set to pixels of the imaging element corresponding to the image of the subject located in the direction pointed by the lower side in the longitudinal direction of the image capturing device 5*a*, the direction of the optical axis of a lens of the image capturing device 5*a*, or the direction pointed by a projecting portion of the image capturing device 5*a*.

Further, in the present embodiment, the predetermined area refers to an area of the omnidirectional image viewable to a user. The predetermined area depends on the viewpoint of the user and the angle of view of an image capturing device. The predetermined area may be a previously set area or an area to be selected for display by the user. Since the term "predetermined area" used here refers to the area viewable to a user, the predetermined area may also be described as the viewable area.

The attitude information of an image capturing device is any information capable of identifying a given direction pointed by the image capturing device. For example, the attitude information may be information of the degree of tilt of the image capturing device from the image capturing device in the erected state thereof or information related to rotation of the image capturing device around the axes in a three-dimensional space.

A method of generating the omnidirectional image will be described with FIG. 2A to FIG. 9.

The exterior of the image capturing device 5a will first be described with FIGS. 2A to 2C.

The image capturing device 5a is a digital camera for capturing an image to generate a three-dimensional, 360-degree omnidirectional image based on the captured image. FIG. 2A is a right side view of the image capturing device 5a. FIG. 2B is a front view of the image capturing device 5a. FIG. 2C is a plan view of the image capturing device 5a.

As illustrated in FIG. 2A, the image capturing device 5a has a size suitable for being held by a human hand. Further, as illustrated in FIGS. 2A to 2C, an upper portion of the image capturing device 5a is equipped with imaging elements 103a and 103b, which are formed on one surface and the other surface, respectively, of the image capturing device 5a. Each of the imaging elements 103a and 103b is implemented by an image sensor, and is used with an optical member (e.g., a fisheye lens 102a or 102b in FIG. 11) capable of capturing a hemispherical image with an angle of view of at least 180 degrees. Further, as illustrated in FIG. 2B, the surface of the image capturing device 5a with the imaging element 103b is equipped with an operation device 115 including a shutter button SB (see FIGS. 25 and 26). As well as the shutter button SB, other buttons such as a wireless fidelity (Wi-Fi, registered trademark) button and a shooting mode switching button may also be formed on any surface of the image capturing device 5a such as a side surface of the image capturing device 5a.

Figure 3:
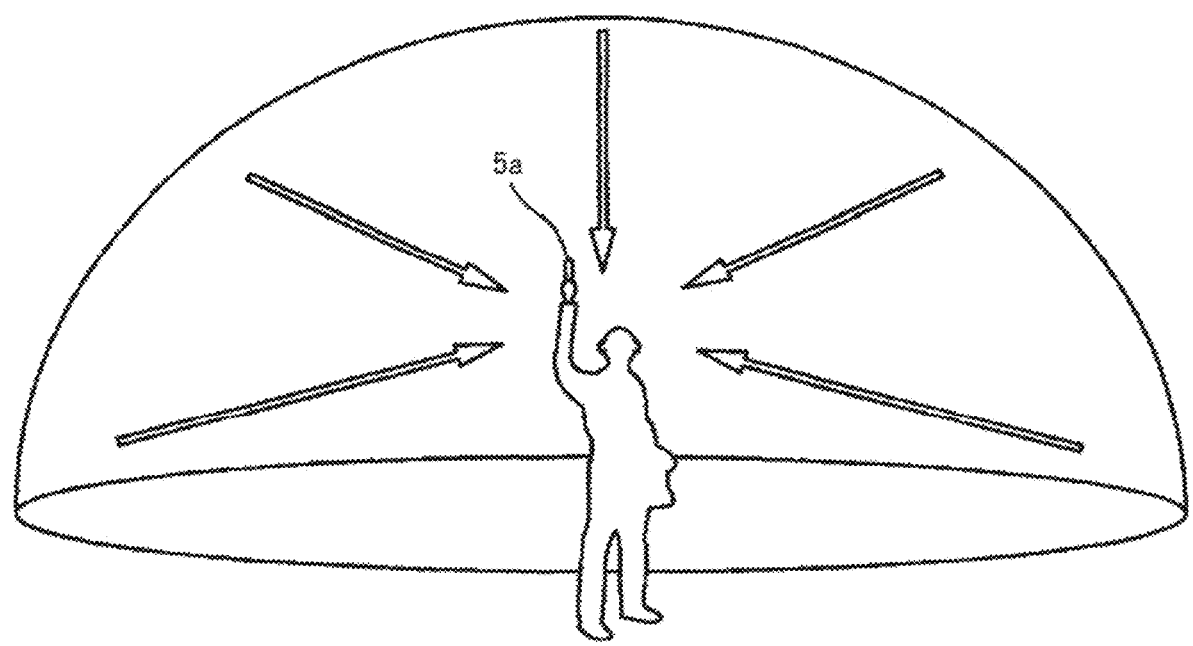
FIG. 3 is a conceptual diagram illustrating use of the image capturing device.

With reference to FIG. 3, a description will be given of a situation in which the image capturing device 5a is used.

FIG. 3 is a conceptual diagram illustrating use of the image capturing device 5a. As illustrated in FIG. 3, the image capturing device 5a is used as held by a hand of a user to capture the image of a subject around the user. In this case, the image of the subject around the user is captured by the imaging elements 103a and 103b illustrated in FIGS. 2A to 2C to obtain two hemispherical images.

With reference to FIG. 4A to FIG. 5B, a description will be given of an overview of a process of generating the omnidirectional image from the images captured by the image capturing device 5a.

Figure 4A:
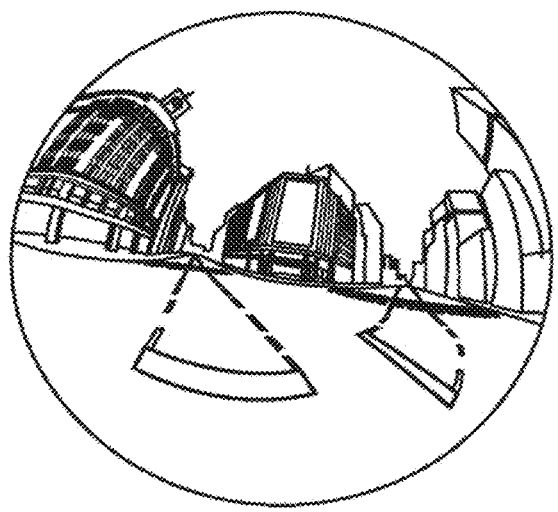
FIG. 4A is a diagram illustrating a front hemispherical image captured by the image capturing device.
Figure 4B:
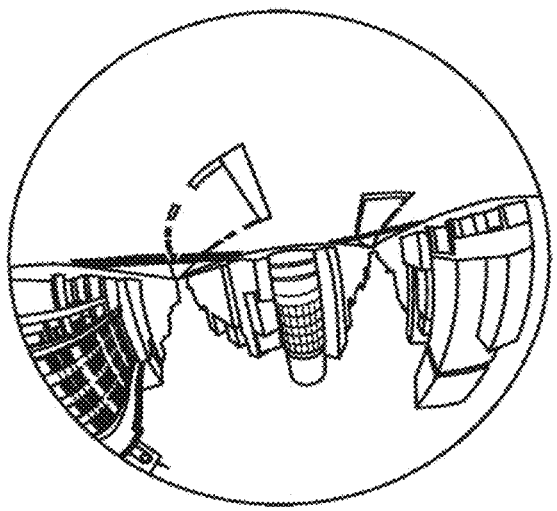
FIG. 4B is a diagram illustrating a rear hemispherical image captured by the image capturing device.
Figure 4C:
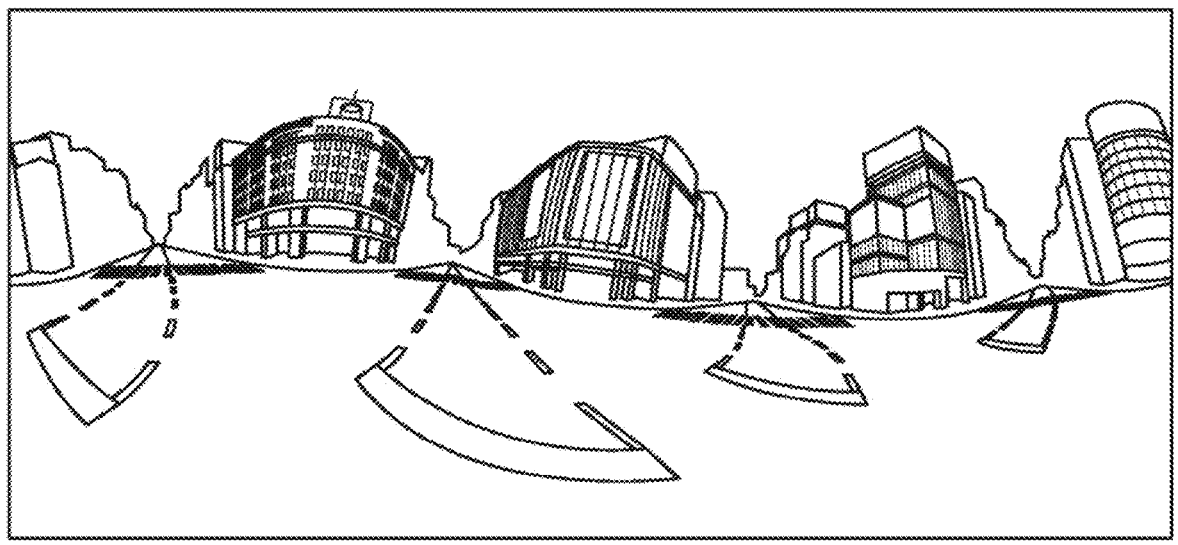
FIG. 4C is a diagram illustrating an equidistant cylindrical image generated from the hemispherical images by equidistant cylindrical projection.
Figure 5B:
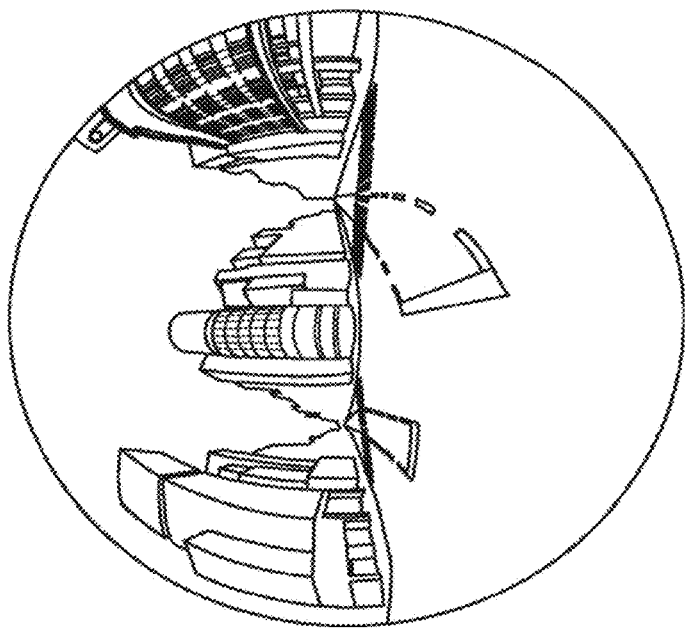
FIG. 5B is a diagram illustrating an omnidirectional image obtained from the equidistant cylindrical image.
Figure 5A:
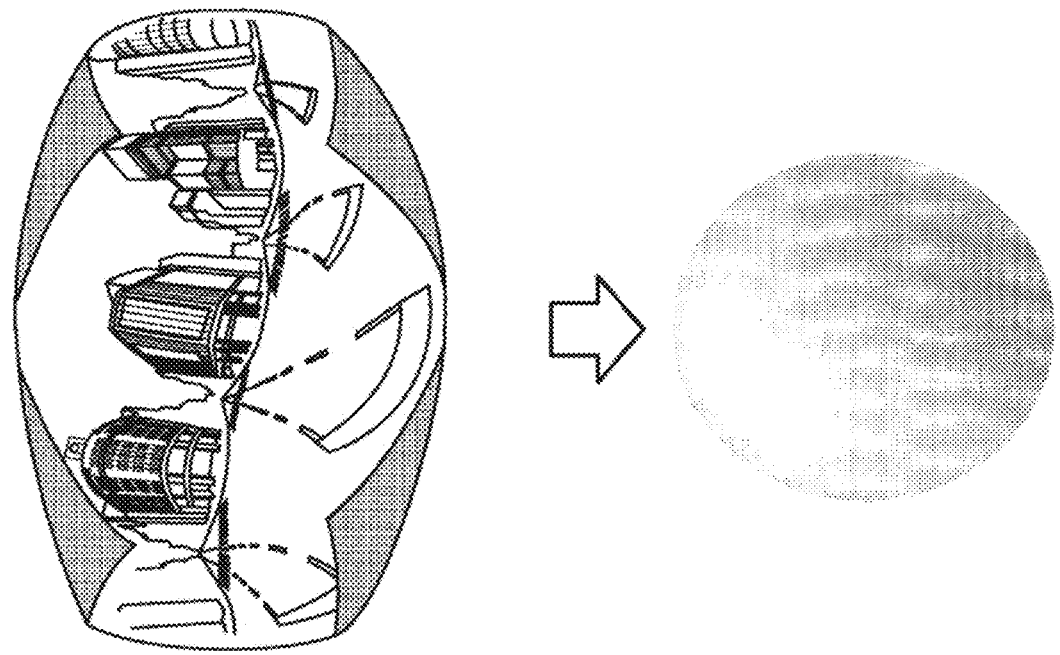
FIG. 5A is a conceptual diagram illustrating the equidistant cylindrical image covering a sphere.

FIG. 4A is a diagram illustrating a front hemispherical image captured by the image capturing device 5a. FIG. 4B is a diagram illustrating a rear hemispherical image captured by the image capturing device 5a. FIG. 4C is a diagram illustrating an image generated from the hemispherical images by equidistant cylindrical projection (hereinafter referred to as the equidistant cylindrical image). FIG. 5A is a conceptual diagram illustrating the equidistant cylindrical image covering a sphere. FIG. 5B is a diagram illustrating an omnidirectional image obtained from the equidistant cylindrical image.

As illustrated in FIG. 4A, the front hemispherical image captured by the imaging element 103a is distorted by the fisheye lens 102a. Further, as illustrated in FIG. 4B, the rear hemispherical image captured by the imaging element 103b is distorted by the fisheye lens 102b. The image capturing device 5a combines the front hemispherical image and the rear hemispherical image rotated therefrom by 180 degrees, to thereby generate an equidistant cylindrical image, as illustrated in FIG. 4C.

Then, with an application programming interface (API) such as open graphics library for embedded systems (OpenGL ES, registered trademark), the equidistant cylindrical image is placed to the surface of a sphere to cover the spherical surface, as illustrated in FIG. 5A. Thereby, the omnidirectional image CE as illustrated in FIG. 5B is generated. The omnidirectional image CE is thus expressed as the equidistant cylindrical image facing the center of the sphere. OpenGL ES is a graphics library application used to visualize two-dimensional or three-dimensional data. The omnidirectional image CE may be a still or video image.

As described above, the omnidirectional image CE is obtained as the image placed on a sphere to cover the spherical surface, and thus is perceived as unnatural to human eyes. Therefore, the predetermined area image of the predetermined area as a part of the omnidirectional image CE is displayed as a planar image with less distortion to be perceived as less unnatural to human eyes.

Display of the predetermined area image will be described with FIG. 6 to FIG. 7B.

Figure 6:
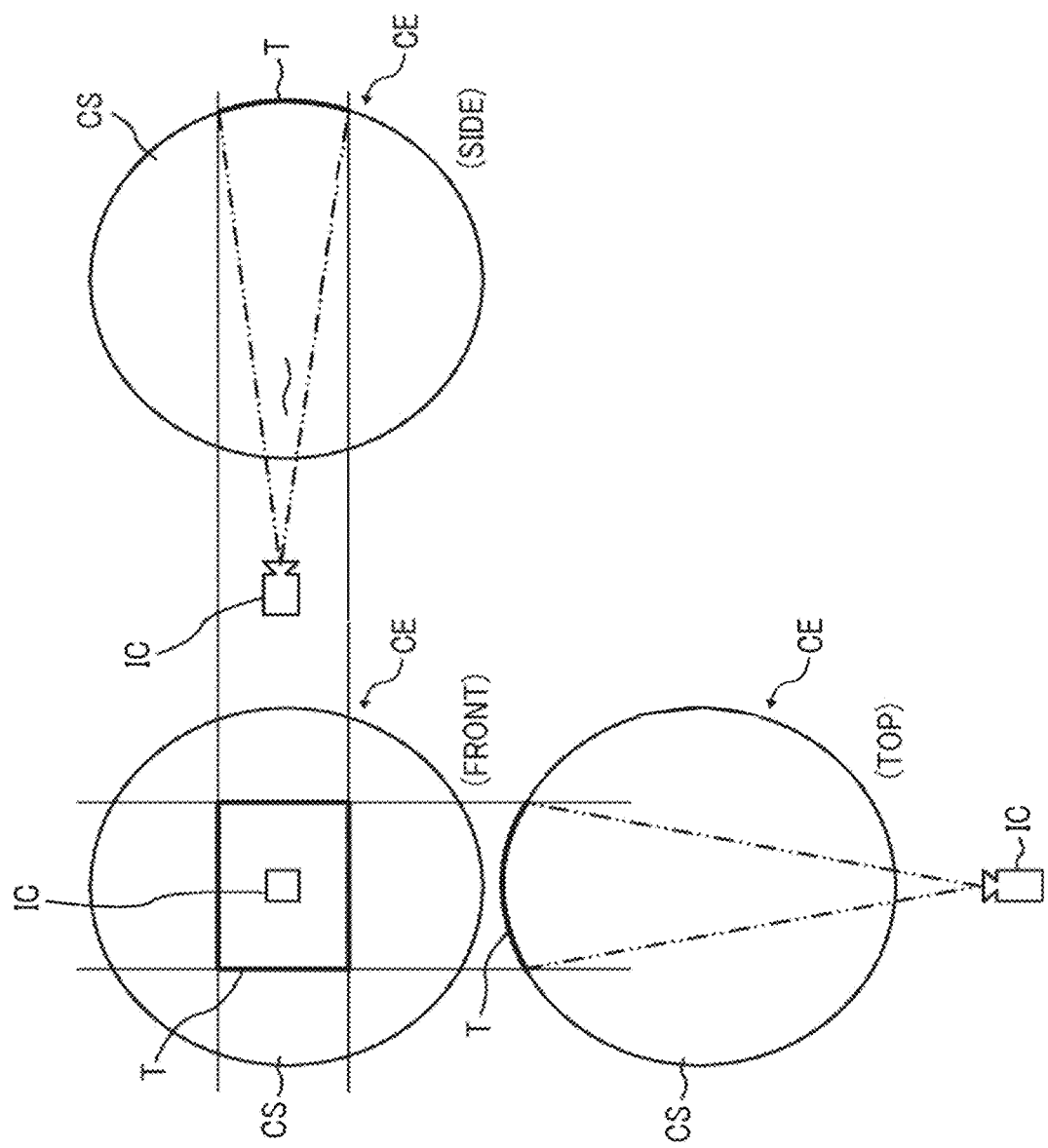
FIG. 6 is a diagram illustrating respective positions of a virtual camera and a predetermined area of the omnidirectional image when the omnidirectional image is expressed as a three-dimensional solid sphere.
Figure 7A:
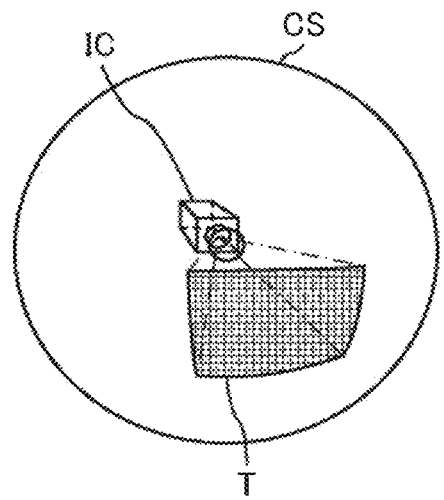
FIG. 7A is a perspective view of the omnidirectional image in FIG. 6 as the solid sphere.

FIG. 6 is a diagram illustrating respective positions of a virtual camera IC and a predetermined area T when the omnidirectional image CE is expressed as a three-dimensional solid sphere CS. The position of the virtual camera IC corresponds to the position of the viewpoint of a user viewing the omnidirectional image CE expressed as the three-dimensional solid sphere CS. FIG. 7A is a perspective view of the omnidirectional image CE in FIG. 6 as the solid sphere CS. FIG. 7B is a diagram illustrating a predetermined area image Q displayed on a display. In FIG. 7A, the omnidirectional image CE in FIG. 6 is illustrated as the three-dimensional solid sphere CS. When the omnidirectional image CE generated as described above is expressed as the solid sphere CS, the virtual camera IC is located outside the omnidirectional image CE, as illustrated in FIG. 6. The predetermined area T of the omnidirectional image CE corresponds to an imaging area of the virtual camera IC, and is identified by predetermined area information. The predetermined area information represents the imaging direction and the angle of view of the virtual camera IC in a three-dimensional virtual space including the omnidirectional image CE.

Figure 7B:
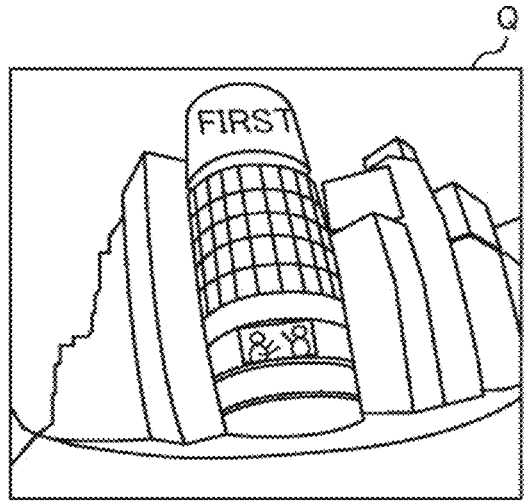
FIG. 7B is a diagram illustrating an image of the predetermined area displayed on a display of a communication terminal included in the image communication system.

As illustrated in FIG. 7B, the predetermined area T in FIG. 7A is displayed on a predetermined display as the image of the imaging area of the virtual camera IC. The image illustrated in FIG. 7B is the predetermined area image Q expressed by initially set predetermined area information, for example. The predetermined area information may be expressed not as the position coordinates of the virtual camera IC but as coordinates (X, Y, Z) of the imaging area of the virtual camera IC corresponding to the predetermined area T. The following description will be given with an imaging direction (rH, rV) and an angle of view (a) of the virtual camera IC.

The relationship between the predetermined area information and the image of the predetermined area T will be described with FIG. 8.

Figure 8:
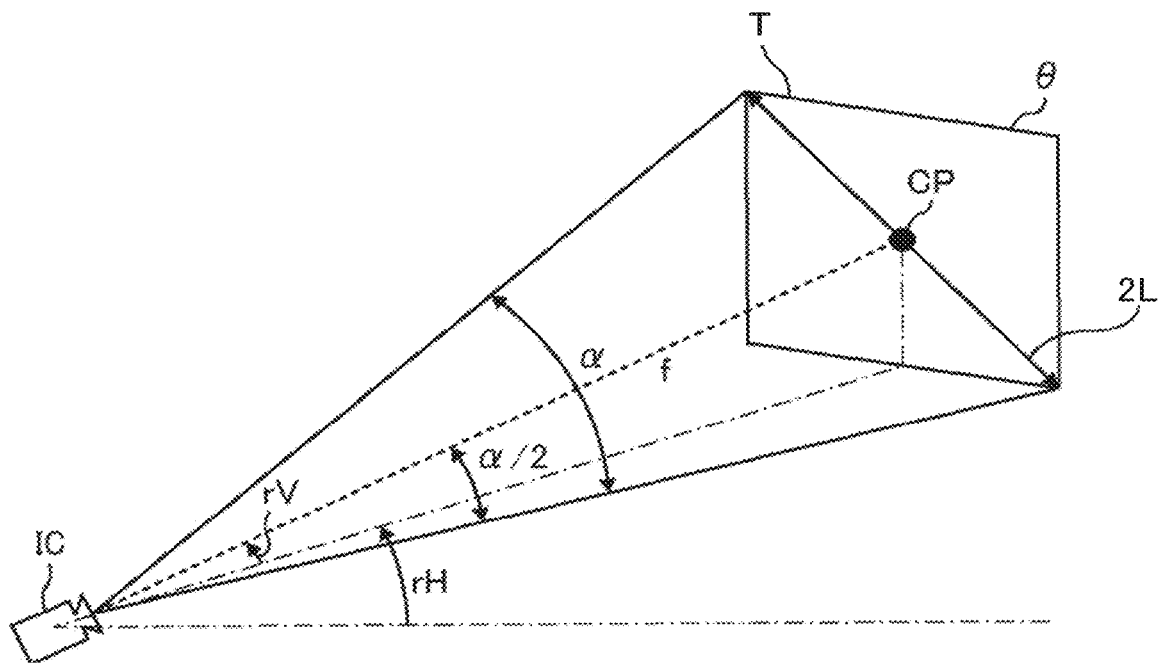
FIG. 8 is a diagram illustrating the relationship between predetermined area information and the image of the predetermined area.

FIG. 8 is a diagram illustrating the relationship between the predetermined area information and the image of the predetermined area T. As illustrated in FIG. 8, rH represents the horizontal radian, and rV represents the vertical radian. Further, a represents the angle of view. That is, the attitude of the virtual camera IC is changed such that the point of interest of the virtual camera IC represented by the imaging direction (rH, rV) corresponds to a center point CP of the predetermined area T as the imaging area of the virtual camera IC. The predetermined area image Q is the image of the predetermined area T of the omnidirectional image CE in FIG. 6. Further, f represents the distance from the virtual camera IC to the center point CP, and L represents the distance between a given vertex of the predetermined area T and the center point CP. Thus, 2L represents the length of a diagonal of the predetermined area T. Further, in FIG. 8, a trigonometric function typically expressed as $L/f=\tan(\alpha/2)$ holds.

Figure 9:
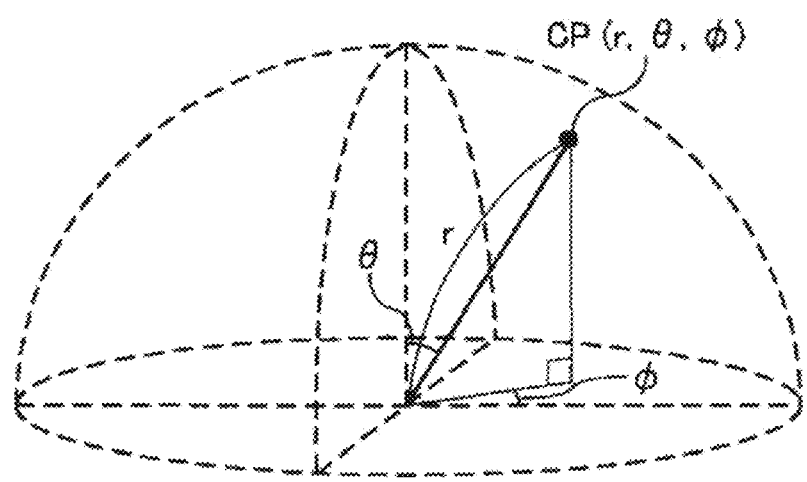
FIG. 9 is a diagram illustrating a point in a three-dimensional Euclidean space represented by spherical coordinates.

FIG. 9 is a diagram illustrating a point in a three-dimensional Euclidean space represented by spherical coordinates. The position coordinates of the center point CP are expressed as $(r, \theta, \varphi)$ in a spherical polar coordinate system. Herein, r, $\theta$, and $\varphi$ represent the radius vector, the polar angle, and the azimuth, respectively. The radius vector r corresponds to the distance from the center point CP to the origin of a three-dimensional virtual space including the omnidirectional image, and thus is equal to the distance f. FIG. 9 illustrates the relationships between these elements. In the following description, the center point CP will be described with the position coordinates $(r, \theta, \varphi)$ thereof.

A schematic configuration of the image communication system 10 of the embodiment will be described with FIG. 10.

Figure 10:
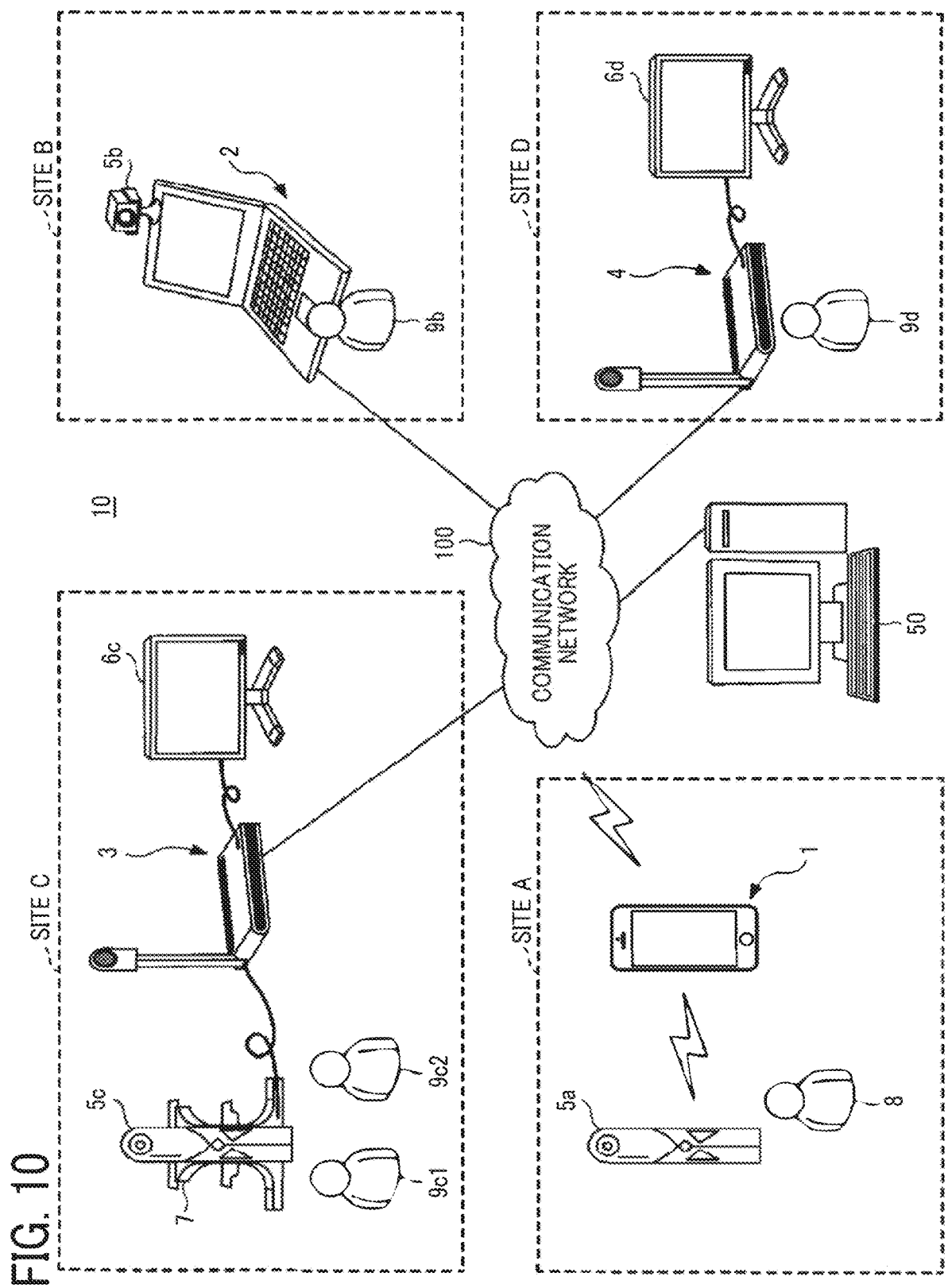
FIG. 10 is a schematic diagram illustrating a configuration of the image communication system of the embodiment.

FIG. 10 is a schematic diagram illustrating a configuration of the image communication system 10 of the embodiment. As illustrated in FIG. 10, in the image communication system 10 of the embodiment, communication terminals 1, 2, 3 and 4 placed at sites A, B, C and D communicate with each other via the communication network 100 such as the Internet to share images therebetween. The image capturing device 5a and the communication terminal 1 are placed at the site A, and the communication terminal 2 and an image capturing device 5b are placed at the site B. Further, an image capturing device 5c, the communication terminal 3, and a display 6c are placed at the site C, and the communication terminal 4 and a display 6d are placed at the site D.

Each of the image capturing devices 5a and 5c is a special digital camera for capturing the image of a subject (e.g., an object or surroundings) and obtaining two hemispherical images to generate an omnidirectional image based on the hemispherical images. The image capturing device 5b, on the other hand, is a commonly used digital camera for capturing the image of a subject (e.g., an object or surroundings) and obtaining a typical planar image.

The communication terminals 3 and 4 are video conference terminals dedicated to video conference. The communication terminals 3 and 4 display the image of a video call on the displays 6c and 6d, respectively, via a wired cable such as a universal serial bus (USB) cable. Each of the communication terminals 3 and 4 normally captures the image of a user, for example, with a camera 312 (see FIG. 12). For example, however, if the communication terminal 3 is connected, via a wired cable, to a cradle 7 to which the image capturing device 5c is attached, the image capturing device 5c is given priority over the camera 312 to obtain the omnidirectional image. When used with the wired cable, the cradle 7 not only enables communication between the image capturing device 5c and the communication terminal 3 but also supports the image capturing device 5c and supplies power thereto.

Each of the communication terminals 1 and 2 is a general-purpose information processing apparatus that communicates with another communication terminal at another site by operating application software for video conference. The communication terminal 1 may be, but is not limited to, a laptop personal computer (PC), a mobile phone, a smartphone, a tablet terminal, a car navigation system, a game console, a personal digital assistant (PDA), a wearable PC, or a desktop PC, for example.

The communication terminal 1 displays the image of a video call on a display 917 (see FIG. 14) of the communication terminal 1. The communication terminal 1 normally captures the image with a complementary metal oxide semiconductor (CMOS) sensor 905 (see FIG. 14) of the communication terminal 1. With a wireless communication technology conforming to a standard such as the Wi-Fi or Bluetooth (registered trademark) standard, the communication terminal 1 is also capable of acquiring the omnidirectional image obtained by the image capturing device 5a.

The communication terminal 2 displays the image of a video call on the display 917 of the communication terminal 2. The communication terminal 2 captures the image of a user, for example, with image capturing device 5b externally attached to the communication terminal 2.

Each of the communication terminals 1 to 4 is installed with OpenGL ES to generate the predetermined area information representing the predetermined area T forming a part of the omnidirectional image or generate the predetermined area image from the omnidirectional image transmitted from another communication terminal. The communication terminals 1 to 4 are therefore capable of displaying the predetermined area image cut out from the omnidirectional image.

At the site A, there is at least one photographer 8 holding in a hand the image capturing device 5a or a stick member attached to the image capturing device 5a. The photographer 8 is able to move with the image capturing device 5a. The communication terminal 1 displays on the display 917 thereof the images captured by the image capturing devices 5a to 5c and the camera 312 of the communication terminal 4.

At the site B, there is one user 9b. The communication terminal 2 displays on the display 917 thereof the images captured by the image capturing devices 5a to 5c and the camera 312 of the communication terminal 4. The user 9b at the site B is included in users who pay attention to the point of interest specified by the photographer 8. The number of users at the site B, which is one in this example, is illustrative.

At the site C, there are two users 9c1 and 9c2. The communication terminal 3 displays on the display 6c the images captured by the image capturing devices 5a to 5c and the camera 312 of the communication terminal 4. The users 9c1 and 9c2 at the site C are included in the users who pay attention to the point of interest specified by the photographer 8. The number of users at the site C, which is two in this example, is illustrative.

At the site D, there is one user 9d. The communication terminal 4 displays on the display 6d the images captured by the image capturing devices 5a to 5c and the camera 312 of the communication terminal 4. The user 9d at the site D is included in the users who pay attention to the point of interest specified by the photographer 8. The number of users at the site D, which is one in this example, is illustrative.

A communication management system 50 manages and controls the communication between the communication terminals 1 to 4, and thus also functions as a communication control system. The communication management system 50 is installed in, for example, a service provider company that provides a video communication service. The communication management system 50 may be implemented by a single computer, or may be implemented by a plurality of computers to which units (e.g., functions, devices, and memories) of the communication management system 50 are divided and allocated.

The number of sites, the type of the communication terminals 1 to 4 placed at the respective sites, the type of the image capturing devices 5a to 5c, and the number of users illustrated in FIG. 10 are illustrative. In the present embodiment, the minimum number of sites is two: the site A and another site. At the site B, the image capturing device 5b may be omitted; it suffices if the communication terminal 2 is capable of displaying the omnidirectional image transmitted from the site A.

Further, the image capturing device 5a and the communication terminal 1 at the site A may be integrated together. That is, if the image capturing device 5a has a function to connect to the communication network 100, the communication terminal 1 may be omitted. In this case, the image capturing device 5a functions as the communication terminal 1. This is because, in the present embodiment, the photographer 8 is able to specify the point of interest with the image capturing device 5a. If the communication terminal 1 is provided at the site A, however, the photographer 8 is also able to specify the point of interest by operating the communication terminal 1. Further, the communication terminal 1 may receive the omnidirectional image and the coordinates of the point of interest via a storage medium, without communicating with the image capturing device 5a at the site A.

In the following description, a given one of the image capturing devices 5a to 5c will be simply described as the image capturing device 5. Similarly, a given one of the displays 6c and 6d will be simply described as the display 6.

With reference to FIG. 11 to FIG. 14, a detailed description will be given of respective hardware configurations of the image capturing devices 5a and 5c, the communication terminals 1 to 4, and the communication management system 50 of the embodiment. The image capturing device 5b is a commonly used camera, and thus description thereof will be omitted.

A hardware configuration of each of the image capturing devices 5a and 5c will be described with FIG. 11.

Figure 11:
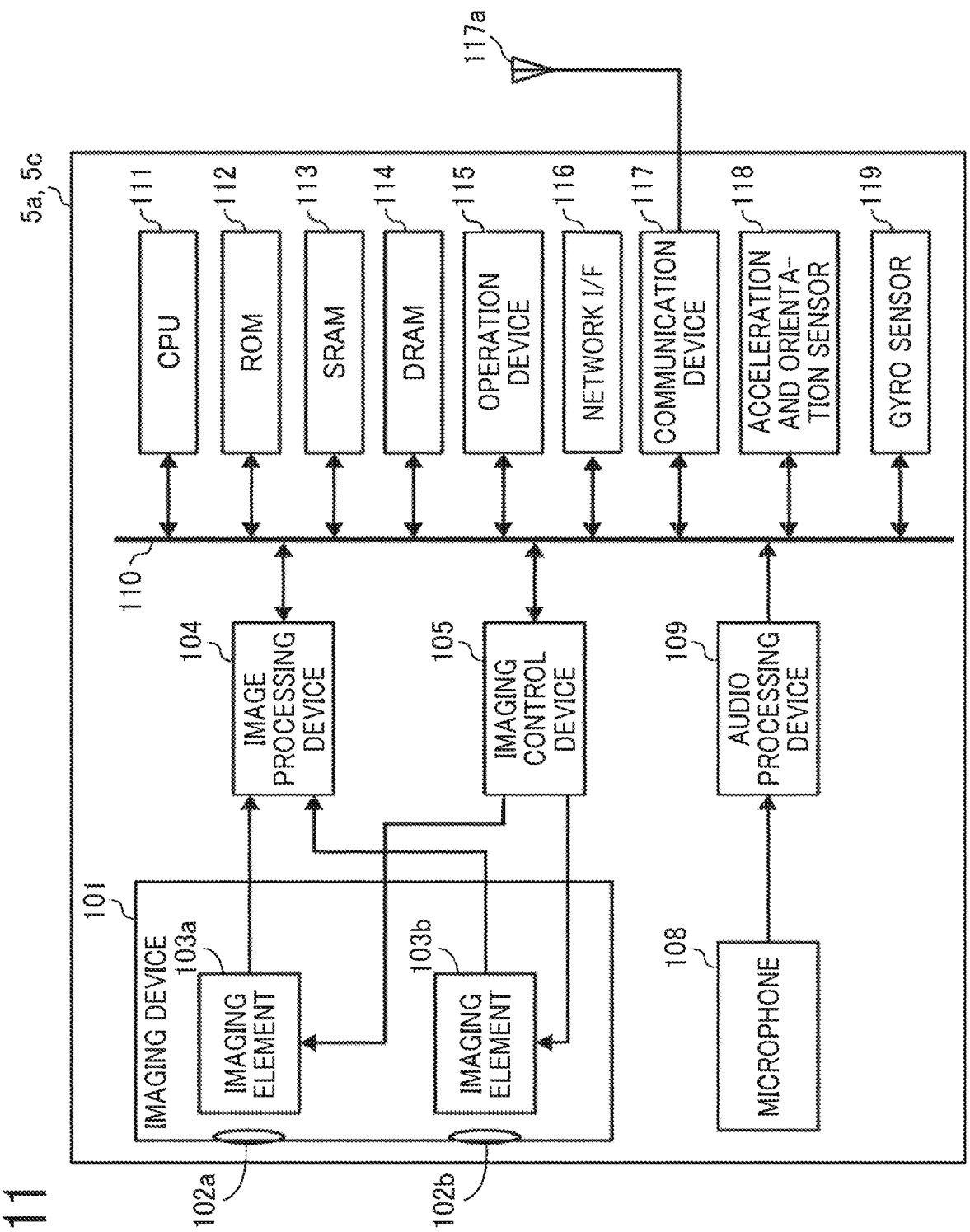
FIG. 11 is a diagram illustrating an exemplary hardware configuration of the image capturing device.

FIG. 11 is a diagram illustrating a hardware configuration of each of the image capturing devices 5a and 5c. The following description will be given on the assumption that each of the image capturing devices 5a and 5c is an omnidirectional (i.e., all-directional) image capturing device with two imaging elements. However, the number of imaging elements may be three or more. Further, each of the image capturing devices 5a and 5c is not necessarily required to be a device dedicated to the purpose of capturing the all-directional image. Therefore, an all-directional image capturing device may be additionally attached to a typical digital camera or smartphone, for example, to provide substantially the same functions as those of the image capturing device 5a or 5c.

As illustrated in FIG. 11, each of the image capturing devices 5a and 5c includes an imaging device 101, an image processing device 104, an imaging control device 105, a microphone 108, an audio processing device 109, a central processing unit (CPU) 111, a read only memory (ROM) 112, a static random access memory (SRAM) 113, a dynamic RAM (DRAM) 114, an operation device 115, a network interface (I/F) 116, a communication device 117, an antenna 117a, an acceleration and orientation sensor 118, and a gyro sensor 119.

The imaging device 101 includes two fisheye lenses 102a and 102b and two imaging elements 103a and 103b corresponding thereto. The fisheye lenses 102a and 102b are wide-angle lenses each having an angle of view of at least 180 degrees for forming a hemispherical image. Each of the imaging elements 103a and 103b includes an image sensor, a timing generating circuit, and a group of registers, for example. For example, the image sensor may be a CMOS or charge coupled device (CCD) sensor that converts an optical image formed by the fisheye lens 102a or 102b into image data of electrical signals and outputs the image data. The timing generating circuit generates a horizontal or vertical synchronization signal or a pixel clock signal for the image sensor. Various commands and parameters for the operation of the imaging element 103a or 103b are set in the group of registers.

Each of the imaging elements 103a and 103b of the imaging device 101 is connected to the image processing device 104 via a parallel I/F bus, and is connected to the imaging control device 105 via a serial I/F bus (e.g., an inter-integrated circuit ($I^2C$) bus). The image processing device 104 and the imaging control device 105 are connected to the CPU 111 via a bus 110. The bus 110 is further connected to the ROM 112, the SRAM 113, the DRAM 114, the operation device 115, the network I/F 116, the communication device 117, the acceleration and orientation sensor 118, and the gyro sensor 119, for example.

The image processing device 104 receives image data items from the imaging elements 103a and 103b via the parallel I/F bus, performs a predetermined process on the image data items, and combines the processed image data items to generate the data of the equidistant cylindrical image as illustrated in FIG. 4C.

The imaging control device 105 sets commands in the groups of registers of the imaging elements 103a and 103b via the serial I/F bus such as the $I^2C$ bus, with the imaging control device 105 and imaging elements 103a and 103b acting as a master device and slave devices, respectively. The imaging control device 105 receives the commands from the CPU 111. The imaging control device 105 further receives data such as status data from the groups of registers of the imaging elements 103a and 103b via the serial I/F bus such as the $I^2C$ bus, and transmits the received data to the CPU 111.

The imaging control device 105 further instructs the imaging elements 103a and 103b to output the image data when the shutter button SB of the operation device 115 is pressed down. The image capturing device 5a or 5c may have a preview display function or a video display function using a display (e.g., the display 917 of the communication terminal 1 or the display 6c connected to the communication terminal 3). In this case, the imaging elements 103a and 103b continuously output the image data at a predetermined frame rate. The frame rate is defined as the number of frames per minute.

The imaging control device 105 also functions as a synchronization controller that cooperates with the CPU 111 to synchronize the image data output time between the imaging elements 103a and 103b. In the present embodiment, the image capturing devices 5a and 5c are not equipped with a display, but may be equipped with a display.

The microphone 108 converts sound into audio (signal) data. The audio processing device 109 receives the audio data from the microphone 108 via an I/F bus, and performs a predetermined process on the audio data.

The CPU 111 controls an overall operation of the image capturing device 5a or 5c, and executes various processes. The ROM 112 stores various programs for the CPU 111. The SRAM 113 and the DRAM 114 are used as work memories, and store programs executed by the CPU 111 and data being processed. The DRAM 114 particularly stores image data being processed by the image processing device 104 and processed data of the equidistant cylindrical image.

The operation device 115 collectively refers to components such as various operation buttons including the shutter button SB, a power switch, and a touch panel that has a display function and an operation function. The user operates the operation buttons to input various imaging modes and imaging conditions, for example.

The network I/F 116 collectively refers to interface circuits (e.g., a USB I/F circuit) to connect to external devices or apparatuses such as an external medium (e.g., a secure digital (SD) card) and a PC. The network I/F 116 may be a wireless or wired interface. Via the network I/F 116, the data of the equidistant cylindrical image stored in the DRAM 114 may be recorded on an external medium, or may be transmitted as necessary to an external apparatus such as the communication terminal 3.

The communication device 117 communicates with an external apparatus such as the communication terminal 1 or 3 via the antenna 117a of the image capturing device 5a or 5c in accordance with a near field wireless communication technology conforming to the Wi-Fi or near field communication (NFC) standard, for example. The data of the equidistant cylindrical image may also be transmitted to an external apparatus such as the communication terminal 1 or 3 via the communication device 117.

The acceleration and orientation sensor 118 outputs orientation and tilt information by calculating the orientation and tilt (i.e., the roll angle, the yaw angle, and the pitch angle) of the image capturing device 5a or 5c from the geomagnetism. The orientation and tilt information is an example of related information (i.e., meta data) conforming to the exchangeable image file format (Exif) standard. The orientation and tilt information is used in image processing such as image correction of the captured image. The related information includes data such as the date and time of capturing the image and the data capacity of the image data.

The gyro sensor 119 is a triaxial or hexaxial sensor that detects the respective rates of rotation around the X-axis, the Y-axis, and the Z-axis. The rates of rotation are accumulated (i.e., integrated) to obtain respective rotation angles, which represents the attitude information.

A hardware configuration of each of the communication terminals 3 and 4 (i.e., the video conference terminal) will be described with FIG. 12.

Figure 12:
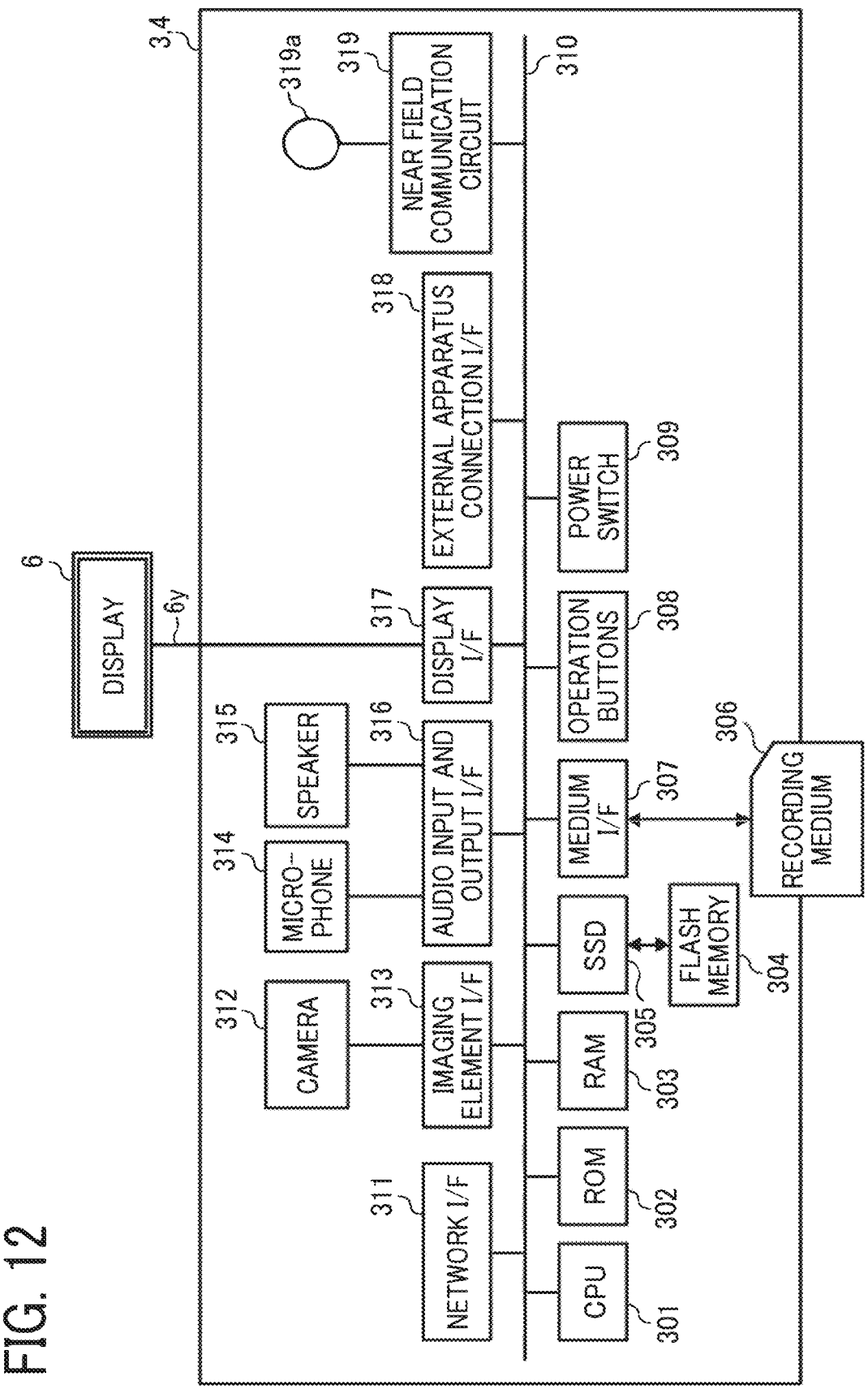
FIG. 12 is a diagram illustrating an exemplary hardware configuration of communication terminals included in the image communication system.

FIG. 12 is a diagram illustrating a hardware configuration of each of the communication terminals 3 and 4. As illustrated in FIG. 12, each of the communication terminals 3 and 4 includes a CPU 301, a ROM 302, a RAM 303, a flash memory 304, a solid state drive (SSD) 305, a medium I/F 307, operation buttons 308, a power switch 309, a bus line 310, a network I/F 311, a camera 312, an imaging element I/F 313, a microphone 314, a speaker 315, an audio input and output I/F 316, a display I/F 317, an external apparatus connection I/F 318, a near field communication circuit 319, and an antenna 319a for the near field communication circuit 319.

The CPU 301 controls an overall operation of the communication terminal 3 or 4. The ROM 302 stores a program used to drive the CPU 301 such as an initial program loader (IPL). The RAM 303 is used as a work area for the CPU 301. The flash memory 304 stores a communication program, image data, audio data, and other various data. The SSD 305 controls writing and reading of various data to and from the flash memory 304 under the control of the CPU 301. The SSD 305 may be replaced by a hard disk drive (HDD). The medium I/F 307 controls writing (i.e., storage) and reading of data to and from a recording medium 306 such as a flash memory. The operation buttons 308 are operated in the selection of an address by the communication terminal 3 or 4, for example. The power switch 309 is used to switch between ON and OFF of power supply to the communication terminal 3 or 4.

The network I/F 311 is an interface for data communication via the communication network 100 such as the Internet. The camera 312 is a built-in image capturing device that captures the image of a subject under the control of the CPU 301 to obtain image data. The imaging element I/F 313 is a circuit that controls driving of the camera 312. The microphone 314 is a built-in sound collecting device for inputting sounds. The audio input and output I/F 316 is a circuit that processes input of audio signals from the microphone 314 and output of audio signals to the speaker 315 under the control of the CPU 301. The display I/F 317 is a circuit that transmits the image data to the external display 6 under the control of the CPU 301. The external apparatus connection I/F 318 is an interface for connecting the communication terminal 3 or 4 to various external apparatuses. The near field communication circuit 319 is a communication circuit conforming to the NFC or Bluetooth standard, for example.

The bus line 310 includes an address bus and a data bus for electrically connecting the components of the communication terminal 3 or 4 illustrated in FIG. 12 including the CPU 301.

The display 6 is implemented as a liquid crystal or organic electro luminescence (EL) display, for example, that displays the image of the subject and icons for performing various operations. The display 6 is connected to the display I/F 317 by a cable 6y. The cable 6y may be a cable for analog red, green, blue (RGB) video graphics array (VGA) signals, a cable for component video, or a cable for high-definition multimedia interface (HDMI, registered trademark) or digital video interactive (DVI) signals.

The camera 312 includes lenses and a solid-state image sensing device that converts light into electric charge to digitize the still or video image of the subject. The solid-state image sensing device is a CMOS or CCD sensor, for example. The external apparatus connection I/F 318 is connectable to an external apparatus such as an external camera, an external microphone, or an external speaker via a USB cable, for example. If an external camera is connected to the external apparatus connection I/F 318, the external camera is driven in preference to the built-in camera 312 under the control of the CPU 301. Similarly, if an external microphone or speaker is connected to the external apparatus connection I/F 318, the external microphone or speaker is driven in preference to the built-in microphone 314 or speaker 315 under the control of the CPU 301.

The recording medium 306 is removable from the communication terminal 3 or 4. The recording medium 306 may be a nonvolatile memory capable of reading and writing data under the control of the CPU 301. In this case, the flash memory 304 may be replaced by an electrically erasable and programmable ROM (EEPROM), for example.

A hardware configuration of the communication management system 50 will be described with FIG. 13.

Figure 13:
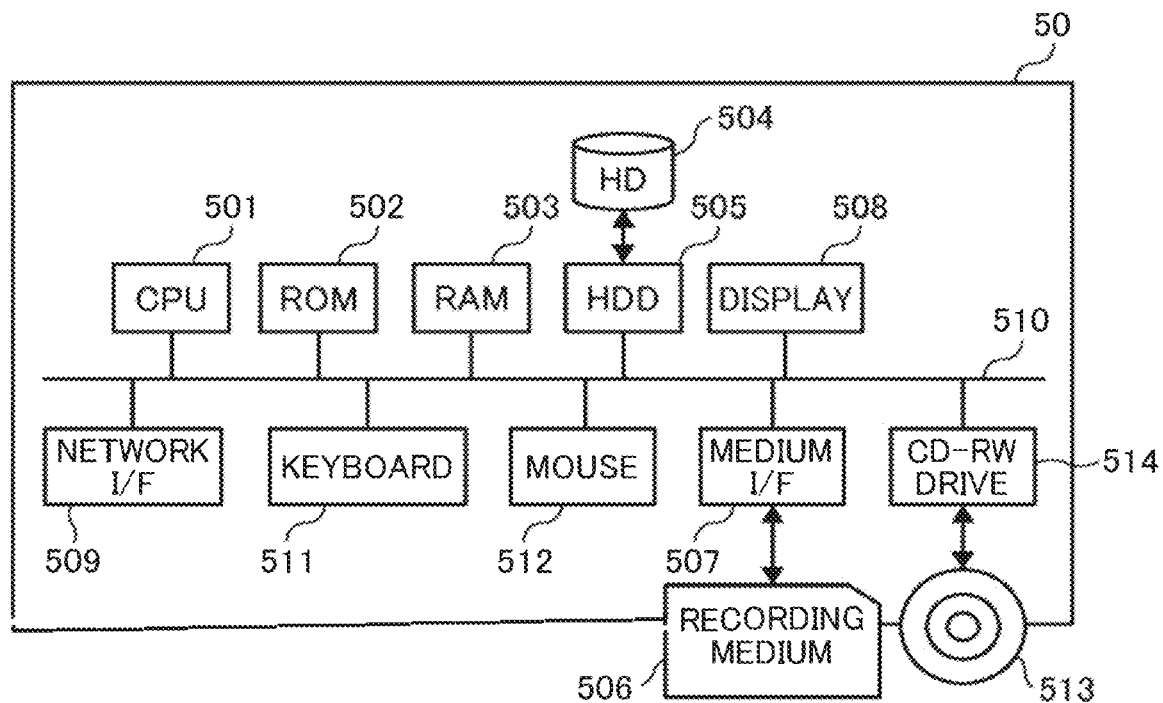
FIG. 13 is a diagram illustrating an exemplary hardware configuration of a communication management system included in the image communication system.

FIG. 13 is a diagram illustrating a hardware configuration of the communication management system 50. The communication management system 50 includes a CPU 501, a ROM 502, a RAM 503, a hard disk (HD) 504, an HDD 505, a medium I/F 507, a display 508, a network I/F 509, a keyboard 511, a mouse 512, a compact disc-rewritable (CD-RW) drive 514, and a bus line 510.

The CPU 501 controls an overall operation of the communication management system 50. The ROM 502 stores a program used to drive the CPU 501 such as an IPL. The RAM 503 is used as a work area for the CPU 501. The HD 504 stores various data of a program for the communication management system 50, for example. The HDD 505 controls writing and reading of various data to and from the HD 504 under the control of the CPU 501. The medium I/F 507 controls writing (i.e., storage) and reading of data to and from a recording medium 506 such as a flash memory. The display 508 displays various information such as a cursor, menus, windows, text, and images. The network I/F 509 is an interface for data communication via the communication network 100. The keyboard 511 includes a plurality of keys for inputting text, numerical values, and various instructions, for example. The mouse 512 is used to select and execute various instructions, select a processing target, and move the cursor, for example. The CD-RW drive 514 controls reading of various data from a CD-RW 513 as an example of a removable recording medium. The bus line 510 includes an address bus and a data bus for electrically connecting the above-described components of the communication management system 50, as illustrated in FIG. 13.

A hardware configuration of each of the communication terminals 1 and 2 will be described with FIG. 14.

Figure 14:
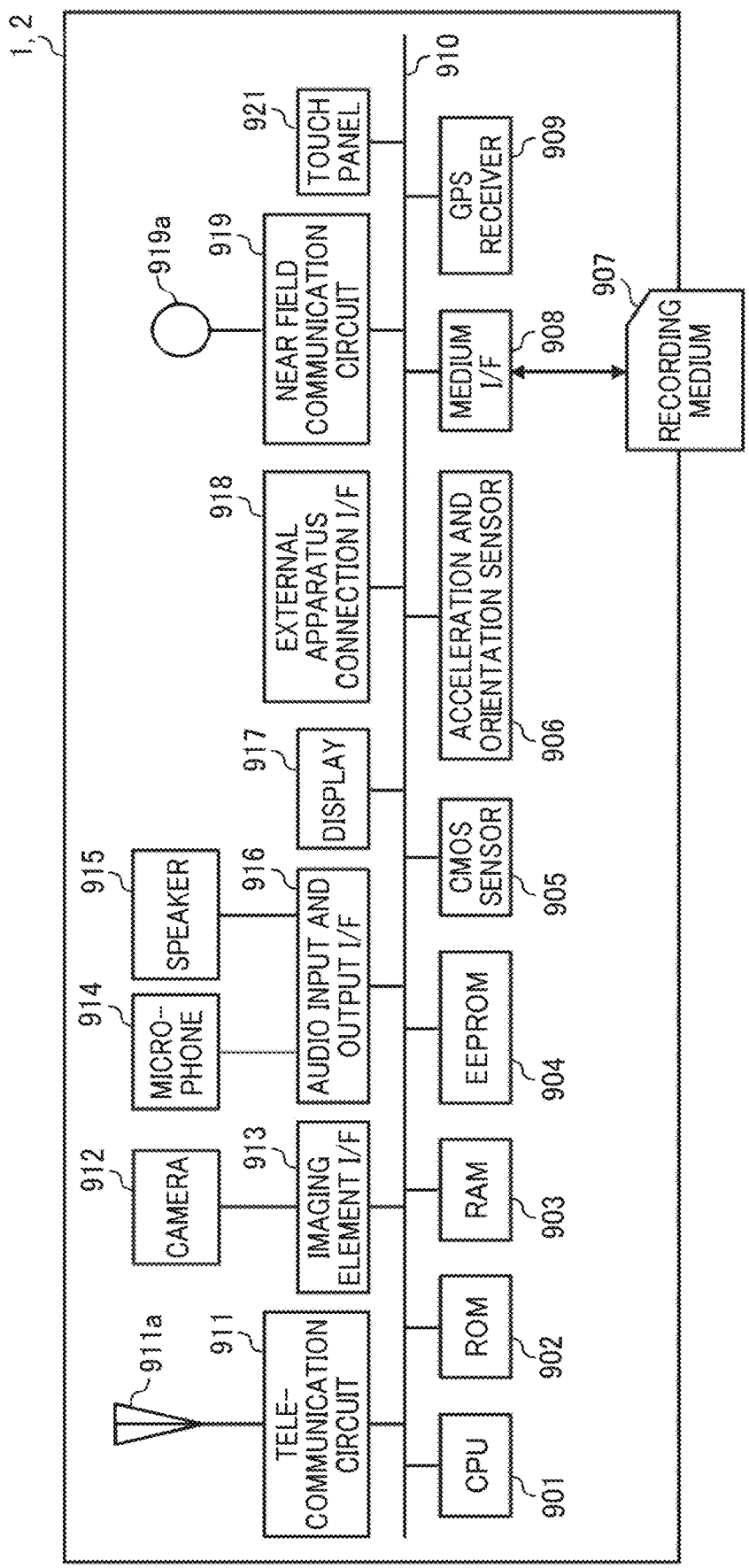
FIG. 14 is a diagram illustrating an exemplary hardware configuration of other communication terminals included in the image communication system.

FIG. 14 is a diagram illustrating a hardware configuration of each of the communication terminals 1 and 2. As illustrated in FIG. 14, each of the communication terminals 1 and 2 includes a CPU 901, a ROM 902, a RAM 903, an EEPROM 904, a CMOS sensor 905, an acceleration and orientation sensor 906, a medium IF 908, and a global positioning system (GPS) receiver 909.

The CPU 901 controls an overall operation of the communication terminal 1 or 2. The ROM 902 stores a program used to drive the CPU 901 such as an IPL. The RAM 903 is used as a work area for the CPU 901. The EEPROM 904 performs reading and writing of various data of a program for the communication terminal 1 or 2, for example, under the control of the CPU 901. The CMOS sensor 905 captures the image of a subject (normally the image of a user) under the control of the CPU 901 to obtain image data. The acceleration and orientation sensor 906 includes various sensors such as an electromagnetic compass that detects geomagnetism, a gyrocompass, and an acceleration sensor. The medium I/F 908 controls writing (i.e., storage) and reading of data to and from a recording medium 907 such as a flash memory. The GPS receiver 909 receives a GPS signal from a GPS satellite.

Each of the communication terminals 1 and 2 further includes a telecommunication circuit 911, an antenna 911a for the telecommunication circuit 911, a camera 912, an imaging element I/F 913, a microphone 914, a speaker 915, an audio input and output I/F 916, a display 917, an external apparatus connection I/F 918, a near field communication circuit 919, an antenna 919a for the near field communication circuit 919, a touch panel 921, and a bus line 910.

The telecommunication circuit 911 is a circuit that communicates with another apparatus via the communication network 100. The camera 912 is a built-in image capturing device that captures the image of a subject under the control of the CPU 901 to obtain image data. The imaging element U/F 913 is a circuit that controls driving of the camera 912. The microphone 914 is a built-in sound collecting device for inputting sounds. The audio input and output I/F 916 is a circuit that that processes input of audio signals from the microphone 914 and output of audio signals to the speaker 915 under the control of the CPU 901. The display 917 is implemented as a liquid crystal or organic EL display, for example, that displays the image of the subject and various icons. The external apparatus connection I/F 918 is an interface for connecting the communication terminal 1 or 2 to various external apparatuses. The near field communication circuit 919 is a communication circuit conforming to the NFC or Bluetooth standard, for example. The touch panel 921 is an input device for the user to operate the communication terminal 1 or 2 by pressing the display 917. The bus line 910 includes an address bus and a data bus for electrically connecting the above-described components of the communication terminal 1 or 2 including the CPU 901.

A recording medium (e.g., a CD-ROM) or an HD storing the above-described programs may be shipped to the market as a program product.

A functional configuration of the image communication system 10 of the present embodiment will be described with FIGS. 15A to 22.

FIGS. 15A to 16B are functional block diagrams illustrating functional blocks of the image communication system 10. As illustrated in FIG. 15A, the image capturing device 5a includes a receiving unit 12a, an imaging unit 13a, a sound collecting unit 14a, an attitude information acquiring unit 15a, an image processing unit 16a, a communication unit 18a, and a storing and reading unit 19a. Except for the image processing unit 16a, each of these units is a function or device implemented when at least one of the components illustrated in FIG. 11 operates in response to a command from the CPU 111 in accordance with a program for the image capturing device 5a deployed on the DRAM 114 from the SRAM 113. The image processing unit 16a is implemented by a circuit module such as an application specific integrated circuit (ASIC), a digital signal processor (DSP), or a field programmable gate array (FPGA). Alternatively, the image processing unit 16a may be implemented by software.

The image capturing device 5a further includes a storage unit 1000a implemented by the ROM 112, the SRAM 113, and the DRAM 114 illustrated in FIG. 11. The storage unit 1000a stores globally unique identifiers (GUIDs) of the image capturing device 5a.

In the image capturing device 5a, the receiving unit 12a is mainly implemented by the operation device 115 and the processing of the CPU 111 illustrated in FIG. 11. The receiving unit 12a receives an operation input from the photographer 8.

The imaging unit 13a is mainly implemented by the imaging device 101, the image processing device 104, the imaging control device 105, and the processing of the CPU 111 illustrated in FIG. 11. The imaging unit 13a captures the image of surroundings of the image capturing device 5a, for example, to obtain captured image data (i.e., the omnidirectional image).

The sound collecting unit 14a is implemented by the microphone 108, the audio processing device 109, and the processing of the CPU 111 illustrated in FIG. 11. The sound collecting unit 14a collects sounds of the surroundings of the image capturing device 5a.

The attitude information acquiring unit 15a acquires the attitude information of the attitude of the image capturing device 5a (i.e., the tilt of the image capturing device 5a in a three-dimensional space, which may be represented by components of roll, pitch, and yaw). The image processing unit 16a executes a process of combining two hemispherical images to generate one equidistant cylindrical image. This process includes the zenith correction based on the attitude information. Thereby, the coordinates of the point of interest pointed by the upper side in the longitudinal direction of the image capturing device 5a are converted into spherical coordinates (i.e., coordinates of the equidistant cylindrical image) indicating the direction pointed by the photographer 8.

The communication unit 18a is mainly implemented by the processing of the CPU 111 illustrated in FIG. 11. The communication unit 18a communicates with a later-described communication unit 98 of the communication terminal 1 in accordance with a near field wireless communication technology conforming to the NFC, Bluetooth, or Wi-Fi standard, for example.

The storing and reading unit 19a is mainly implemented by the processing of the CPU 111 illustrated in FIG. 11. The storing and reading unit 19a stores various data and information in the storage unit 1000a, and reads therefrom various data and information.

The image capturing device 5c includes a receiving unit 12c, an imaging unit 13c, a sound collecting unit 14c, an attitude information acquiring unit 15c, an image processing unit 16c, a communication unit 18c, a storing and reading unit 19c, and a storage unit 1000c. These units implement similar functions to those of the receiving unit 12a, the imaging unit 13a, the sound collecting unit 14a, the attitude information acquiring unit 15a, the image processing unit 16a, the communication unit 18a, the storing and reading unit 19a, and the storage unit 1000a of the image capturing device 5a, and thus description thereof will be omitted.

A functional configuration of the communication terminal 1 will be described.

As illustrated in FIG. 15B, the communication terminal 1 includes a transmitting and receiving unit 91, a receiving unit 92, an image and audio processing unit 93, a display control unit 94, a determination unit 95, a generation unit 96, a calculation unit 97, a communication unit 98, and a storing and reading unit 99. Each of these units is a function or device implemented when at least one of the components illustrated in FIG. 14 operates in response to a command from the CPU 901 in accordance with the program for the communication terminal 1 deployed on the RAM 903 from the EEPROM 904.

The communication terminal 1 further includes a storage unit 9000 implemented by the ROM 902, the RAM 903, and the EEPROM 904 illustrated in FIG. 14. The storage unit 9000 stores an image type management database (DB) 9001, an image capturing device management DB 9002, and a predetermined area management DB 9003.

The image type management DB 9001 is configured as an image type management table illustrated in FIG. 17. The image capturing device management DB 9002 is configured as an image capturing device management table illustrated in FIG. 18. The predetermined area management DB 9003 is configured as a predetermined area information management table illustrated in FIG. 19.

FIG. 17 is a conceptual diagram illustrating the image type management table. In the image type management table, an image data ID, an internet protocol (IP) address, and a source name are stored and managed in association with each other. The image data ID is an example of image data identification information for identifying the image data in video communication. Image data items transmitted from the same transmitter terminal are assigned with the same image data ID, enabling a destination terminal (i.e., receiver terminal) to identify the transmitter terminal having transmitted the image data received by the receiver terminal. The IP address is an example of the address of the transmitter terminal. The IP address of the transmitter terminal represents the IP address of the communication terminal that transmits the image data represented by the image data ID associated with the IP address. The source name is a name for identifying the image capturing device that outputs the image data represented by the image data ID associated with the source name. The source name is an example of image type information. The source name is generated by the communication terminal 3, for example, in accordance with a predetermined naming rule.

For example, the image type management table of FIG. 17 indicates that four communication terminals with respective IP addresses "1.2.1.3," "1.2.2.3," "1.3.1.3," and "1.3.2.3" have transmitted image data items represented by image data IDs "RS001," "RS002," "RS003," and "RS004." The image type management table further indicates that image types represented by respective source names of the communication terminals are "Video_Wide," "Video_Wide," "Video," and "Video," which represent "special image," "special image," "general image," and "general image," respectively. Herein, the special image is the omnidirectional image.

Data other than the image data may also be managed in association with the image data ID. For example, the data other than the image data includes audio data and material data used in sharing the image displayed on the screen.

FIG. 18 is a conceptual diagram illustrating the image capturing device management table. In the image capturing device management table, a vendor ID (VID) and a product ID (PID) are stored and managed. The VID and the PID are included in the GUIDs of an image capturing device capable of capturing two hemispherical images, based on which the omnidirectional image is generated. For example, the VID and the PID used by a USB device may be used as the GUIDs. The VID and the PID are stored in the communication terminals 3 and 4, for example, in factory shipment thereof, but may be additionally stored therein after the factory shipment.

FIG. 19 is a conceptual diagram illustrating the predetermined area information management table. In the predetermined area information management table, the IP address of the transmitter terminal, the IP address of the destination terminal, and the predetermined area information are stored and managed in association with each other. The IP address of the transmitter terminal is the IP address of the communication terminal that transmits the captured image data. The IP address of the destination terminal is the IP address of the communication terminal to which the captured image data is transmitted. The predetermined area information represents the predetermined area image being displayed by the destination terminal, i.e., the communication terminal to which the captured image data is transmitted. The destination terminal to which the captured image data is transmitted is also the transmitter terminal that transmits the predetermined area information. The predetermined area information is configured as a conversion table for converting the captured image into the predetermined area image, i.e., the image of the predetermined area T of the captured image, as illustrated in FIGS. 6 to 7B. The IP address is an example of address information. The address information includes a media access control (MAC) address and a terminal identification (ID) for identifying the communication terminal. The IP address illustrated in FIG. 19 is a simplified version of the internet protocol version (IPv)4 address. Alternatively, the IPV6 address may be used as the IP address.

For example, when the IP address of the communication terminal 3 is "1.2.1.3," the information managed in the first to third rows of the predetermined area information management table in FIG. 19 indicates that the captured image data transmitted from the communication terminal 3 has been transmitted, via the communication management system 50, to the communication terminal 4 corresponding to the IP address "1.2.2.3," the communication terminal 2 corresponding to the IP address "1.3.1.3," and the communication terminal 1 corresponding to the IP address "1.3.2.3." The information further indicates that the communication terminal 4 is a transmitter terminal having transmitted predetermined area information (r=10, θ=20, φ=30), that the communication terminal 2 is a transmitter terminal having transmitted predetermined area information (r=20, θ=30, φ=40), and that the communication terminal 1 is a transmitter terminal having transmitted predetermined area information (r=30, θ=40, φ=50). That is, the predetermined area information management table manages the predetermined area information used by the communication terminals 1, 2, and 4 to display the omnidirectional image.

If the transmitting and receiving unit 91 receives new predetermined area information corresponding to the IP address of the transmitter terminal of already-managed captured image data and the IP address of the destination terminal of the already-managed captured image data, the storing and reading unit 99 overwrites the corresponding already-managed predetermined area information with the newly received predetermined area information.

The transmitting and receiving unit 91 of the communication terminal 1 is mainly implemented by the telecommunication circuit 911 and the processing of the CPU 901 illustrated in FIG. 14. The transmitting and receiving unit 91 transmits and receives various data and information to and from the communication management system 50 via the communication network 100.

The receiving unit 92 is mainly implemented by the touch panel 921 and the processing of the CPU 901. The receiving unit 92 receives various selections and inputs from the user. As well as the touch panel 921, the receiving unit 92 may also be implemented by another input device such as an audio input device.

The image and audio processing unit 93 is implemented by a command from the CPU 901 illustrated in FIG. 14. The image and audio processing unit 93 performs image processing on the image data of the image of the subject captured by the camera 912. The image and audio processing unit 93 further performs audio processing on audio data of audio signals converted from the voice of the user by the microphone 914.

Based on the image type information such as the source name, the image and audio processing unit 93 performs image processing on the image data received from another communication terminal such that the display control unit 94 displays a resultant image on the display 917. The image and audio processing unit 93 further outputs, to the speaker 915, audio signals of audio data received from another communication terminal via the communication management system 50, to thereby output sound from the speaker 915.

The display control unit 94 is mainly implemented by the display 917 and the processing of the CPU 901. The display control unit 94 executes control for displaying various images and text on the display 917.

The determination unit 95 is mainly implemented by the processing of the CPU 901. The determination unit 95 determines the image type of the image data received from the image capturing device 5a, for example.

The generation unit 96 is mainly implemented by the processing of the CPU 901. Based on the determination by the determination unit 95 of whether the image type of the image data is the general image or the special image (i.e., the omnidirectional image in the present example), the generation unit 96 generates the source name (an example of the image type information) in accordance with the foregoing naming rule. For example, if the determination unit 95 determines that the image type is the general image, the generation unit 96 generates a source name "Video" indicating that the image type is the general image. Further, if the determination unit 95 determines that the image type is the special image, the generation unit 96 generates a source name "Video_Wide" indicating that the image type is the special image.

The calculation unit 97 is mainly implemented by the processing of the CPU 901. Based on the predetermined area information representing the predetermined area T and the predetermined area information received from another communication terminal by the transmitting and receiving unit 91, the calculation unit 97 calculates the position (i.e., position information) of the predetermined area T in the captured image. When the entirety of the captured image is displayed, the entire captured image will also be referred to as the whole image.

The communication unit 98 is mainly implemented by the near field communication circuit 919, the antenna 919a, and the processing of the CPU 901. The communication unit 98 communicates with the communication unit 18a of the image capturing device 5a in accordance with a near field wireless communication technology conforming to the NFC, Bluetooth, or Wi-Fi standard, for example. In the present example, the communication unit 98 and the transmitting and receiving unit 91 are configured as separate communication units, but may be integrated together.

The storing and reading unit 99 is mainly implemented by the processing of the CPU 901. The storing and reading unit 99 stores various data and information in the storage unit 9000, and reads therefrom various data and information.

A functional configuration of the communication terminal 2 will be described with FIG. 16B.

The communication terminal 2 has basically the same functions as those of the communication terminal 1. That is, as illustrated in FIG. 16B, the communication terminal 2 includes a transmitting and receiving unit 71, a receiving unit 72, an image and audio processing unit 73, a display control unit 74, a determination unit 75, a generation unit 76, a calculation unit 77, a communication unit 78, and a storing and reading unit 79. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 2 further includes a storage unit 7000 implemented by the ROM 902, the RAM 903, and the EEPROM 904 illustrated in FIG. 14. The storage unit 7000 stores an image type management DB 7001, an image capturing device management DB 7002, and a predetermined area management DB 7003. These databases are the same in data structure as the image type management DB 9001, the image capturing device management DB 9002, and the predetermined area management DB 9003 of the communication terminal 1, and thus description thereof will be omitted.

A functional configuration of the communication terminal 3 will be described with FIG. 15B.

The communication terminal 3 has basically the same functions as those of the communication terminal 1. That is, as illustrated in FIG. 15B, the communication terminal 3 includes a transmitting and receiving unit 31c, a receiving unit 32c, an image and audio processing unit 33c, a display control unit 34c, a determination unit 35c, a generation unit 36c, a calculation unit 37c, a communication unit 38c, and a storing and reading unit 39c. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 3 further includes a storage unit 3000c implemented by the ROM 302, the RAM 303, and the SSD 305 illustrated in FIG. 12. The storage unit 3000c stores an image type management DB 3001c, an image capturing device management DB 3002c, and a predetermined area management DB 3003c. These databases implement similar functions to those of the image type management DB 9001, the image capturing device management DB 9002, and the predetermined area management DB 9003 of the communication terminal 1, and thus description thereof will be omitted.

A functional configuration of the communication terminal 4 will be described with FIG. 16B.

The communication terminal 4 has basically the same functions as those of the communication terminal 1. That is, as illustrated in FIG. 16B, the communication terminal 4 includes a transmitting and receiving unit 31d, a receiving unit 32d, an image and audio processing unit 33d, a display control unit 34d, a determination unit 35d, a generation unit 36d, a calculation unit 37d, a communication unit 38d, and a storing and reading unit 39d. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 4 further includes a storage unit 3000d implemented by the ROM 302, the RAM 303, and the SSD 305 illustrated in FIG. 12. The storage unit 3000d stores an image type management DB 3001d, an image capturing device management DB 3002d, and a predetermined area management DB 3003d. These databases implement similar functions to those of the image type management DB 9001, the image capturing device management DB 9002, and the predetermined area management DB 9003 of the communication terminal 1, and thus description thereof will be omitted.

Figure 16A:
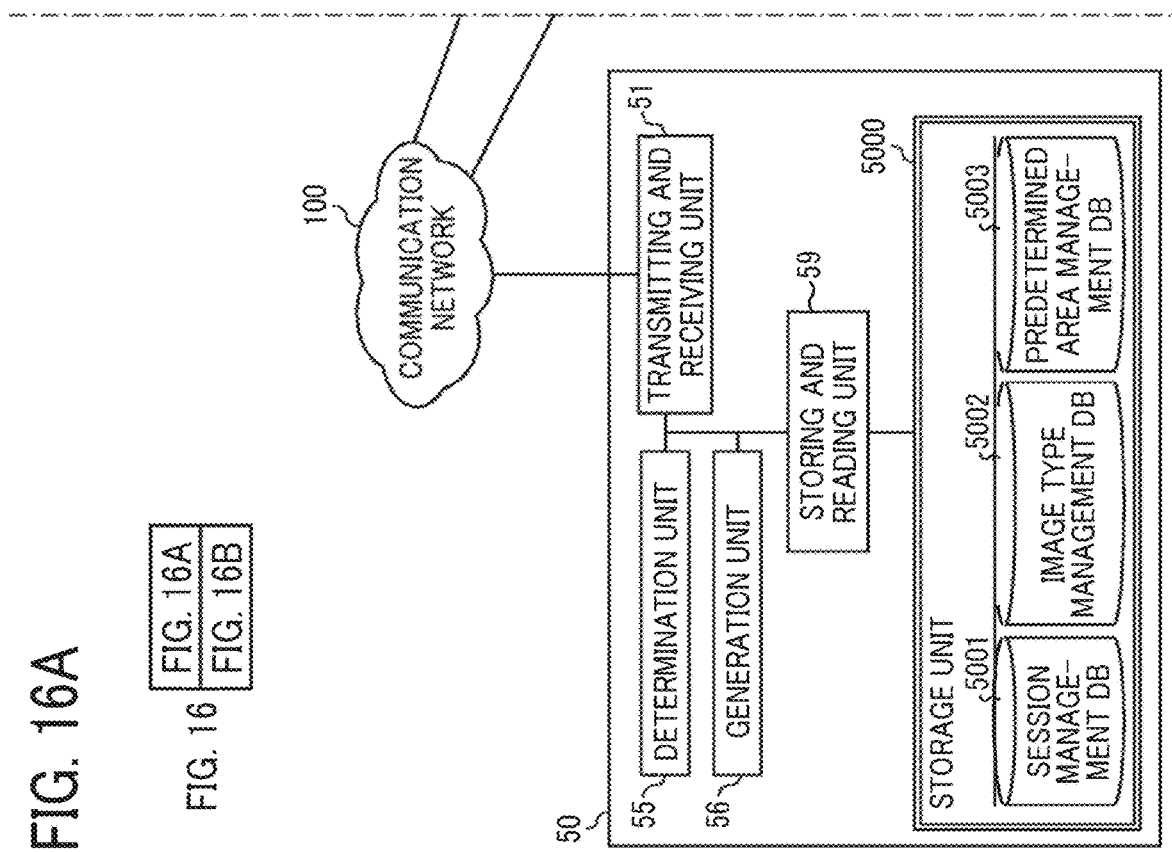

A functional configuration of the communication management system 50 will be described in detail with FIG. 16A.

The communication management system 50 includes a transmitting and receiving unit 51, a determination unit 55, a generation unit 56, and a storing and reading unit 59. Each of these units is a function or device implemented when at least one of the components illustrated in FIG. 13 operates in response to a command from the CPU 501 in accordance with the program for the communication management system 50 deployed on the RAM 503 from the HD 504.

The communication management system 50 further includes a storage unit 5000 implemented by the RAM 503 and the HD 504 illustrated in FIG. 13. The storage unit 5000 stores a session management DB 5001, an image type management DB 5002, and a predetermined area management DB 5003. The session management DB 5001 is configured as a session management table illustrated in FIG. 20. The image type management DB 5002 is configured as an image type management table illustrated in FIG. 21. The predetermined area management DB 5003 is configured as a predetermined area information management table illustrated in FIG. 22.

FIG. 20 is a conceptual diagram illustrating the session management table. In the session management table, a session ID and the IP addresses of participant communication terminals are stored and managed in association with each other. The session ID is an example of session identification information for identifying a communication session that implements a video call. The session ID is generated for each virtual meeting room. The session ID is also managed in each of the communication terminals 1 to 4, and is used thereby in the selection of a communication session. The IP addresses of the participant communication terminals represent the IP addresses of the communication terminals participating in the communication session in the virtual meeting room represented by the session ID associated with the IP addresses.

FIG. 21 is a conceptual diagram illustrating the image type management table. In the image type management table of FIG. 21, in addition to the information items managed in the image type management table of FIG. 17, the session ID managed in the session management table is stored and managed in association with the information items. The image type management table of FIG. 21 indicates that three communication terminals with respective IP addresses "1.2.1.3," "1.2.2.3," and "1.3.1.3" are participating in the communication session in the virtual meeting room represented by the same session ID "se101." The communication management system 50 manages the image data IDs, the IP addresses of the transmitter terminals, and the source names (i.e., the image type information) the same as those managed in communication terminals such as the communication terminals 1 to 4 (i.e., video conference terminals). This is because, when a new communication terminal enters the virtual meeting room, for example, the communication management system 50 transmits the image type information and other information to both the communication terminals already participating in the video call and the newly participating communication terminal. It is thereby unnecessary for the communication terminals already participating in the video call and the newly participating communication terminal to transmit and receive therebetween the image type information and other information.

FIG. 22 is a conceptual diagram illustrating the predetermined area information management table. The predetermined area information management table of FIG. 22 is basically similar in data structure to the predetermined area information management table of FIG. 19. The transmitting and receiving unit 51 transmits the latest predetermined area information to each of the communication terminals 1 to 4 at certain time intervals (e.g., at every 30 seconds), as described later. During the transmission of the predetermined area information in each of the certain time intervals, therefore, all predetermined area information received by the transmitting and receiving unit 51 is saved without being deleted. In the predetermined area information management table of FIG. 22, the predetermined area information is managed such that a newer predetermined area information item is placed at a higher position.

Referring back to FIG. 16A, the transmitting and receiving unit 51 of the communication management system 50 is mainly implemented by the network I/F 509 and the processing of the CPU 501 illustrated in FIG. 13. The transmitting and receiving unit 51 transmits and receives various data and information to and from the communication terminals 1 to 4 via the communication network 100.

The determination unit 55 is mainly implemented by the processing of the CPU 501, and makes various determinations.

The generation unit 56 is mainly implemented by the processing of the CPU 501, and generates the image data ID.

The storing and reading unit 59 is mainly implemented by the HDD 505 and the processing of the CPU 501 illustrated in FIG. 13. The storing and reading unit 59 stores various data and information in the storage unit 5000, and reads therefrom various data and information.

A process of having a communication terminal participate in a specific communication session will be described with FIGS. 23 and 24.

Figure 23:
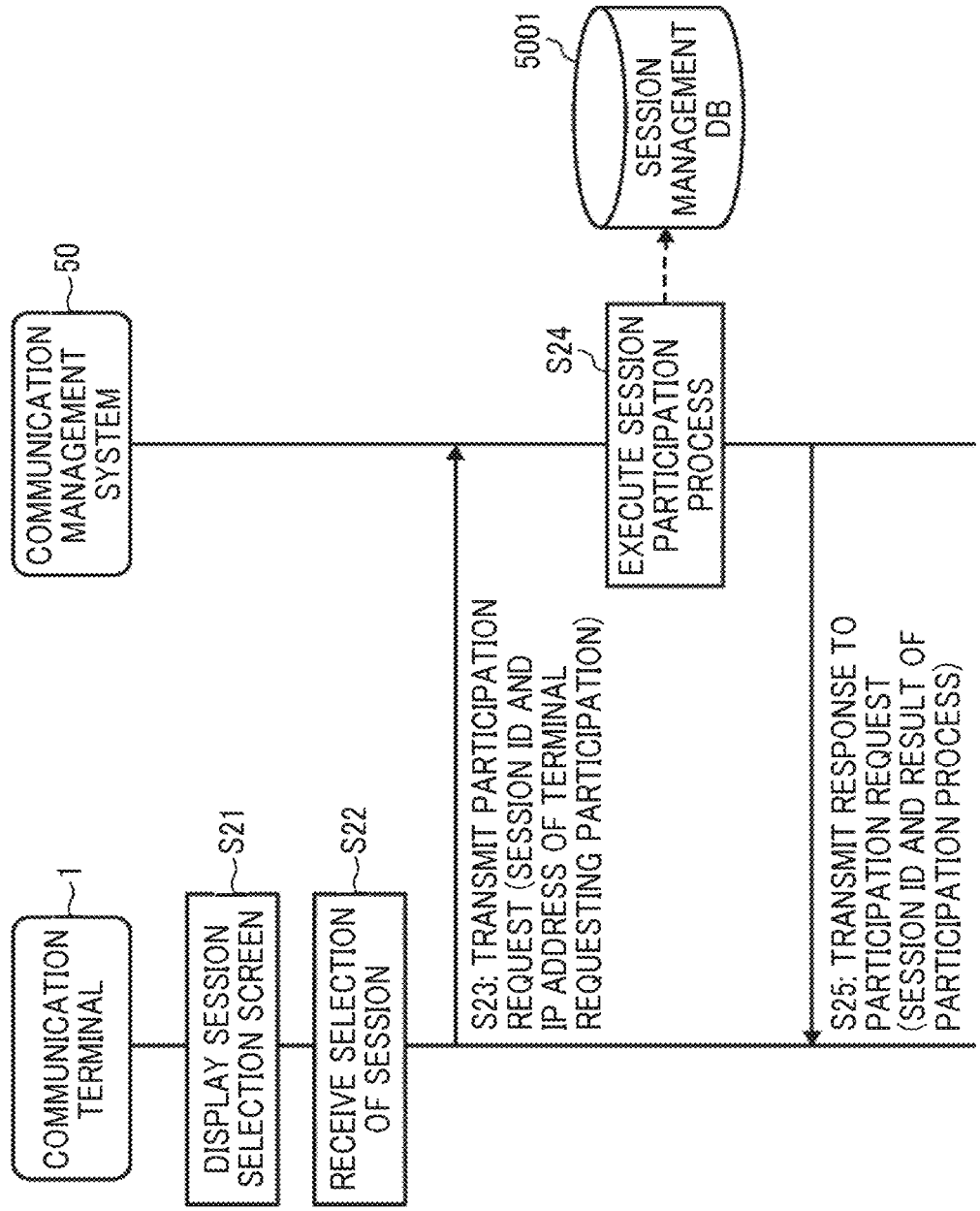
FIG. 23 is a sequence diagram illustrating an example of a process of having a communication terminal of the image communication system participate in a specific communication session.
Figure 24:
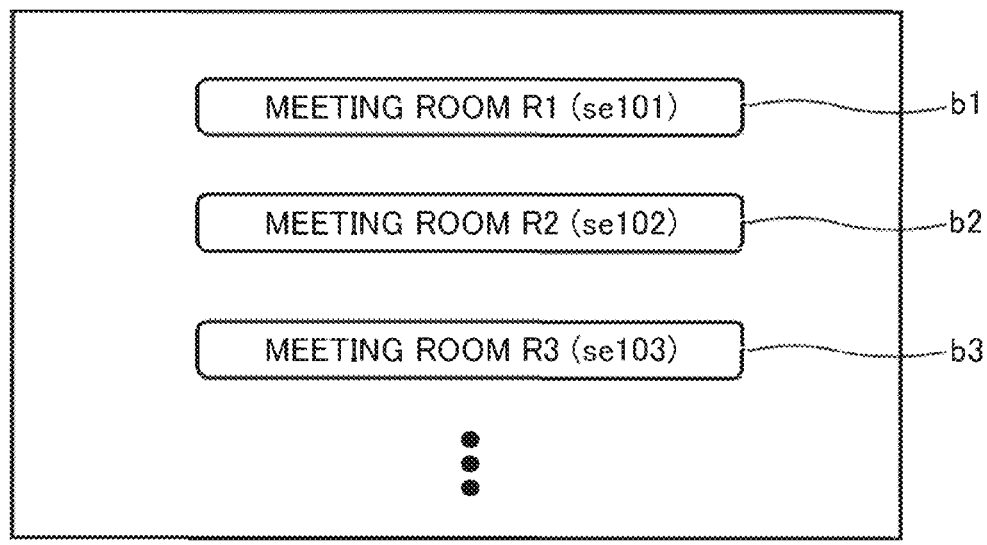
FIG. 24 is a diagram illustrating an example of a selection screen displayed on a communication terminal of the image communication system to select a communication session in a virtual meeting room.

FIG. 23 is a sequence diagram illustrating a process of having a communication terminal participate in a specific communication session. FIG. 24 is a diagram illustrating a selection screen for selecting a communication session in a virtual meeting room.

The photographer 8 at the site A first operates the communication terminal 1 to display the selection screen for selecting a communication session in a virtual meeting room. Then, in the communication terminal 1, the receiving unit 92 receives the operation for displaying the selection screen, and the display control unit 94 displays the selection screen as illustrated in FIG. 24 on the display 917 of the communication terminal 1 (step S21). The selection screen displays selection buttons b1, b2, and b3, which represent virtual meeting rooms R1, R2, and R3, respectively, as options. The selection buttons b1, b2, and b3 are associated with respective session IDs se101, se102, and se103.

The photographer 8 then selects one of the selection buttons b1, b2, and b3 corresponding to a desired virtual meeting room. It is assumed here that the photographer 8 selects the selection button b1. Then, the receiving unit 92 receives the selection of the communication session (step S22). The virtual meeting room selected here is one previously designated for a certain purpose such as viewing of real estate properties, for example.

Then, the transmitting and receiving unit 91 transmits a participation request to the communication management system 50 to participate in the communication session in the virtual meeting room (step S23). The participation request includes the session ID representing the communication session, the selection of which has been received at step S22, and the IP address of the communication terminal 1 transmitting the participation request. Then, the transmitting and receiving unit 51 of the communication management system 50 receives the participation request.

The storing and reading unit 59 of the communication management system 50 then adds the IP address received at step S23 to the session management DB 5001, specifically to the field of a participant terminal IP address in a record corresponding to the session ID received at step S23. Thereby, a communication session participation process is performed (step S24).

The transmitting and receiving unit 51 then transmits a response to the participation request to the communication terminal 1 (step S25). The response to the participation request includes the session ID received at step S23 and a result of the participation process. Then, the transmitting and receiving unit 91 of the communication terminal 1 receives the response to the participation request.

A procedure of a process following a successful participation process will be described.

The communication terminals 2 to 4 at the sites B to D similarly transmit the participation request to the communication management system 50, and select the virtual meeting room selected by the communication terminal 1. Thereby, the communication terminals 1 to 4 participate in the same communication session to have a video call with each other. The communication session participation method described above with FIGS. 23 and 24 is illustrative. For example, the photographer 8 may establish a communication session by specifying identification information of a destination communication terminal or user. In this case, the communication session is established when the destination communication terminal or user specified as the destination (i.e., address) responds to a call from the photographer 8.

The attitude information of the image capturing device 5*a* will be described with FIGS. 25 to 27C.

Figure 25:
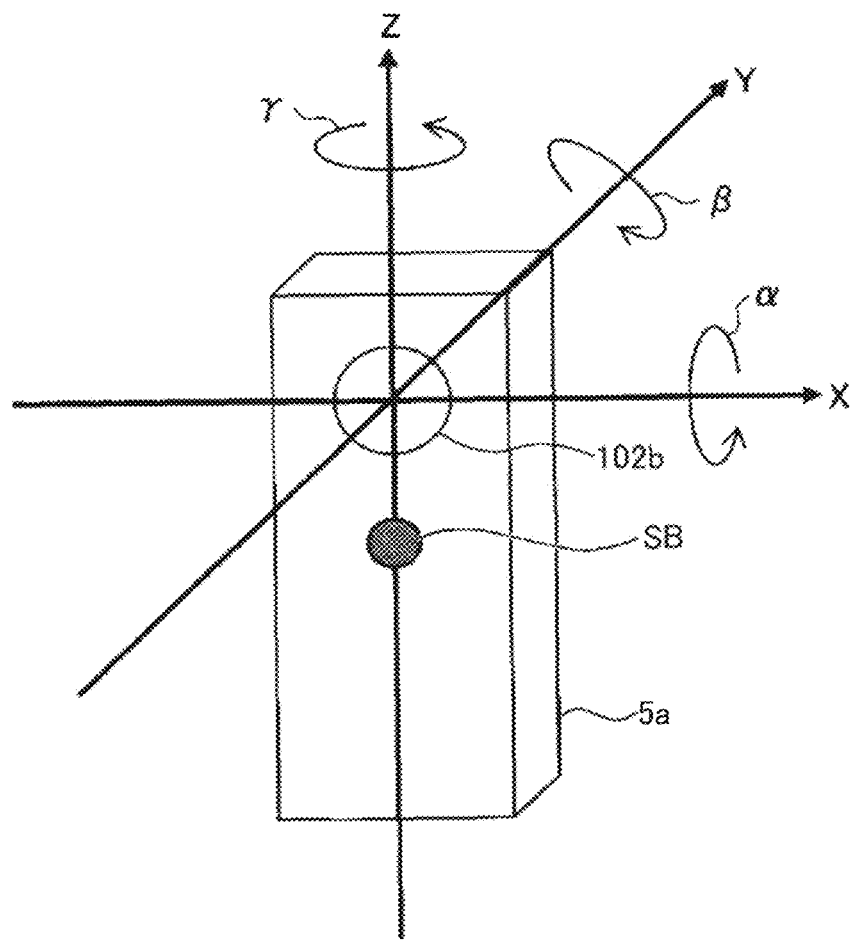
FIG. 25 is a diagram illustrating an example of coordinate axes of the image capturing device.
Figure 26:
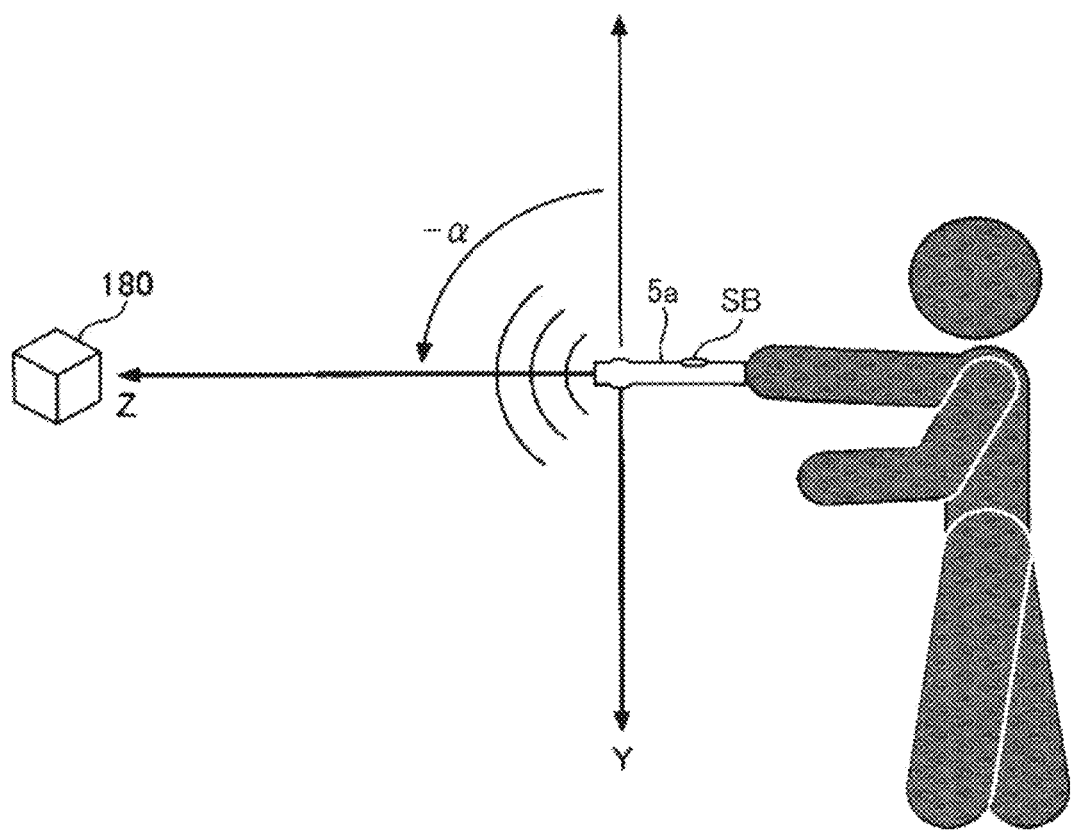
FIG. 26 is a diagram illustrating an example of a reference attitude of the image capturing device.

FIG. 25 is a diagram illustrating an example of coordinate axes of the image capturing device 5*a*. FIG. 26 is a diagram illustrating an example of a reference attitude of the image capturing device 5*a*. The reference attitude of the image capturing device 5*a* refers to the attitude of the image capturing device 5*a* in an initial state.

As illustrated in FIG. 25, the longitudinal direction of the image capturing device 5*a* corresponds to the Z-axis, and the direction of passing through the two fisheye lens 102*a* and 102*b* from the surface of the image capturing device 5*a* with the shutter button SB to the other surface of the image capturing device 5*a* corresponds to the Y-axis. Further, the width direction of the image capturing device 5*a* corresponds to the X-axis. The X-axis, the Y-axis, and the Z-axis move with the movement of the image capturing device 5*a*. The image capturing device 5*a* is rotatable around each of the X-axis, the Y-axis, and the Z-axis. The rotation angle around the X-axis, the rotation angle around the Y-axis, and the rotation angle around the Z-axis are represented as $\alpha$, $\beta$, and $\gamma$, respectively.

As illustrated in FIG. 26, when the photographer 8 points the image capturing device 5*a* at an object 180, the photographer 8 points the upper side in the longitudinal direction of the image capturing device 5*a* to the object 180. When the erected state of the image capturing device 5*a* is defined as the initial state, the rotation angles $\alpha$, $\beta$, and $\gamma$ in the state of FIG. 26 are −90 degrees, 0 degrees, and 0 degrees, respectively.

Figure 27A:
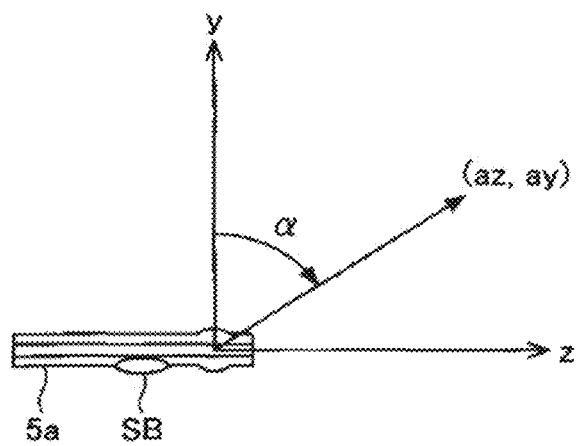
FIGS. 27A to 27C are diagrams illustrating an example of values detected by an acceleration and orientation sensor of the image capturing device.
Figure 27B:
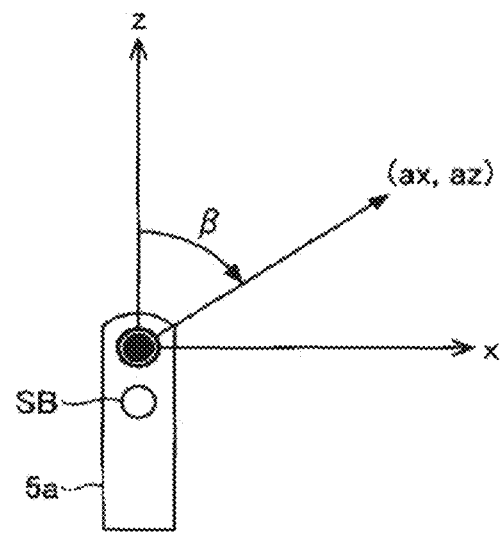
Figure 27C:
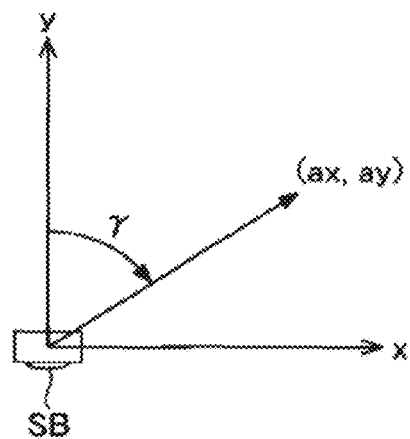

FIGS. 27A to 27C are diagrams illustrating values detected by the acceleration and orientation sensor 118 of the image capturing device 5*a*. As illustrated in FIG. 27A, the image capturing device 5*a* rotates around the X-axis by the rotation angle $\alpha$. When the values detected by the acceleration and orientation sensor 118 are represented as (ax, ay, az), the rotation angle $\alpha$ is expressed as:

$$\alpha = \operatorname{atan}^2(ay, -az) \; ay^{\wedge}2 + az^{\wedge}2 \geq threshR^{\wedge}2$$
$$= 0 \; ay^{\wedge}2 + az^{\wedge}2 < threshR^{\wedge}2$$

Herein, the range of values of the rotation angle $\alpha$ is expressed as $-\pi < \alpha \leq \pi$, and threshR represents a threshold value set as desired.

The rotation around the Y-axis and the rotation around the Z-axis are illustrated as in FIG. 27B and FIG. 27C, respectively. To improve responsiveness, the gyro sensor 119 may be used. Values (g$\alpha$, g$\beta$, g$\gamma$) output from the gyro sensor 119 correspond to an angular velocity (radians per second (rad/sec)). With the values (gα, gβ, gγ) of the gyro sensor 119, the rotation angles α, β, and γ (i.e., the attitude information) of the image capturing device 5*a* may be calculated as:

$$\alpha(n+1) = \alpha(n) + k * g\alpha * dt$$
$$\beta(n+1) = \beta(n) + k * g\beta * dt$$
$$\gamma(n+1) = \gamma(n) + k * g\gamma * dt$$

Herein, the direction of the image capturing device 5*a* in the initial state is expressed as (α(0), β(0), γ(0))=(α0, 0, 0). Further, k represents a coefficient related to the sensitivity of the gyro sensor 119, and the initial value of the coefficient k is set to 1.0. To reduce the influence of movements of a hand holding the image capturing device 5*a*, for example, the initial value of the coefficient k may be adjusted to 0.5, for example, to obtain the effect of a low-pass filter. The thus-obtained values (α, β, γ) represent the attitude information. The rotation angle γ around the Z-axis does not affect the pointing direction of the image capturing device 5*a*, and thus may not be calculated.

The correct value of the rotation angle α around the X-axis is obtainable from the signal of the acceleration and orientation sensor 118 even if the initial value of the rotation angle α is not zero. Further, the rotation angle γ around the Z-axis does not affect the pointing direction of the image capturing device 5*a*, as described above. As for the rotation angle β around the Y-axis, on the other hand, the initial value thereof is simply set to zero. Therefore, if the image capturing device 5*a* is tilted in the initial state at the time of power-on, for example, the correct value of the rotation angle β may not be obtained. When the photographer 8 points the image capturing device 5*a* at an object, therefore, it is desirable that the photographer 8 first initializes the values of the rotation angles α, β, and γ by pressing and holding a predetermined button of the image capturing device 5*a* in the erected state of the image capturing device 5*a*, for example.

Alternatively, the initial value of the rotation angle β around the Y-axis may also be calculated based on the output from the acceleration and orientation sensor 118 similarly to the value of the rotation angle α around the X-axis.

Figure 28A:
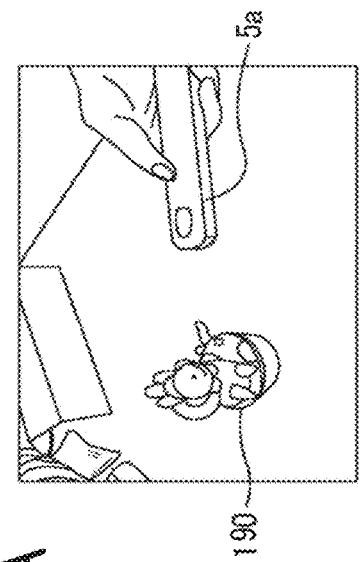
FIG. 28A is a conceptual diagram illustrating a state in which a photographer points the image capturing device at an object.
Figure 28B:
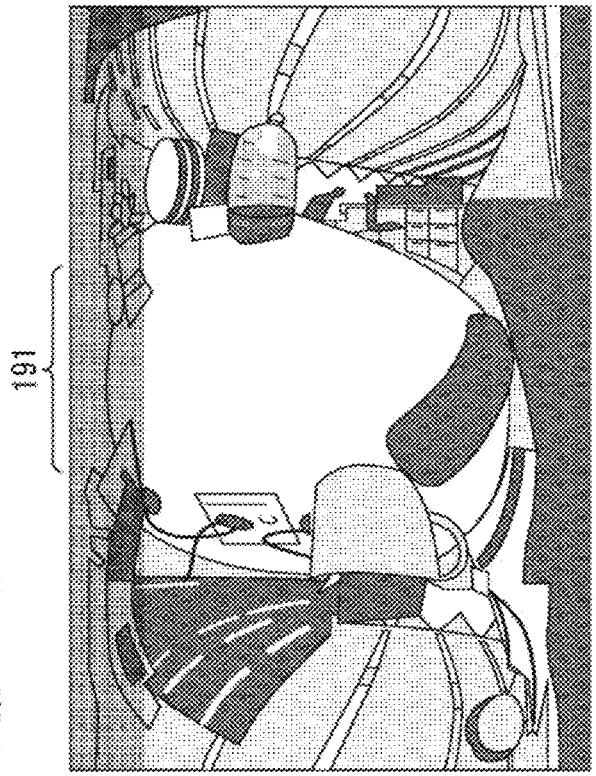
FIG. 28B is a diagram illustrating an example of an equidistant cylindrical image as an omnidirectional image expressed by equidistant cylindrical projection without zenith correction.
Figure 28C:
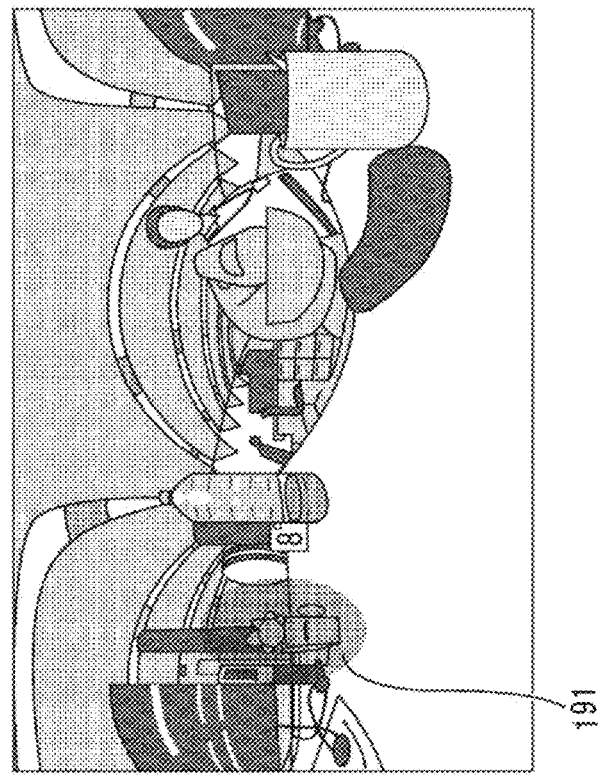
FIG. 28C is a diagram illustrating an example of an equidistant cylindrical image as an omnidirectional image expressed by equidistant cylindrical projection with zenith correction.

With reference to FIGS. 28A to 28C, a description will be given of how the coordinates of the point of interest used by the photographer 8 to point at the object are processed in the zenith correction.

FIG. 28A illustrates a state in which the photographer 8 points the image capturing device 5*a* at an object, specifically a doll 190. For example, when the coordinates of the point of interest represent pixels or an area corresponding to the image of the subject located on the upper side in the longitudinal direction of the image capturing device 5*a*, the image captured in the state of FIG. 28A is rendered as in FIG. 28B. FIG. 28B illustrates an equidistant cylindrical image as an omnidirectional image expressed by equidistant cylindrical projection. This equidistant cylindrical image is not subjected to the zenith correction. In the formation of the equidistant cylindrical image, the subject located on the upper side in the longitudinal direction of the image capturing device 5*a* is extended in the lateral direction in an upper end part of the equidistant cylindrical image. That is, without the zenith correction, the subject located on the upper side in the longitudinal direction of the image capturing device 5*a* is placed in the upper end part of the equidistant cylindrical image. Further, in the equidistant cylindrical image, the subject in the upper end part thereof is extended in the lateral direction. Without the zenith correction, the coordinates of the point of interest remain at the same position in the equidistant cylindrical image.

Irrespective of the attitude of the image capturing device 5*a*, an object located in an upper part of an actual space is placed in an upper part of the image by the image capturing device 5*a*. Similarly, an object located in a lower part of the actual space is placed in a lower part of the image by the image capturing device 5*a*. Therefore, the zenith correction is performed on the image based on the attitude information. FIG. 28C illustrates an equidistant cylindrical image subjected to the zenith correction. The direction and amount of the zenith correction are determined by the attitude information. Therefore, the coordinates of the point of interest in the equidistant cylindrical image are obtained by rotating the coordinates of the original defined point of interest with coordinate conversion information for rotating the image for the zenith correction. In FIG. 28C, the coordinates of the point of interest are encircled by a circle 191. The circle 191 includes the image of the doll 190 illustrated in FIG. 28A. That is, the object pointed by the photographer 8 is identified with the coordinates of the point of interest.

Functions of the image processing unit 16*a* of the image capturing device 5*a* will be described with FIG. 29.

Figure 29:
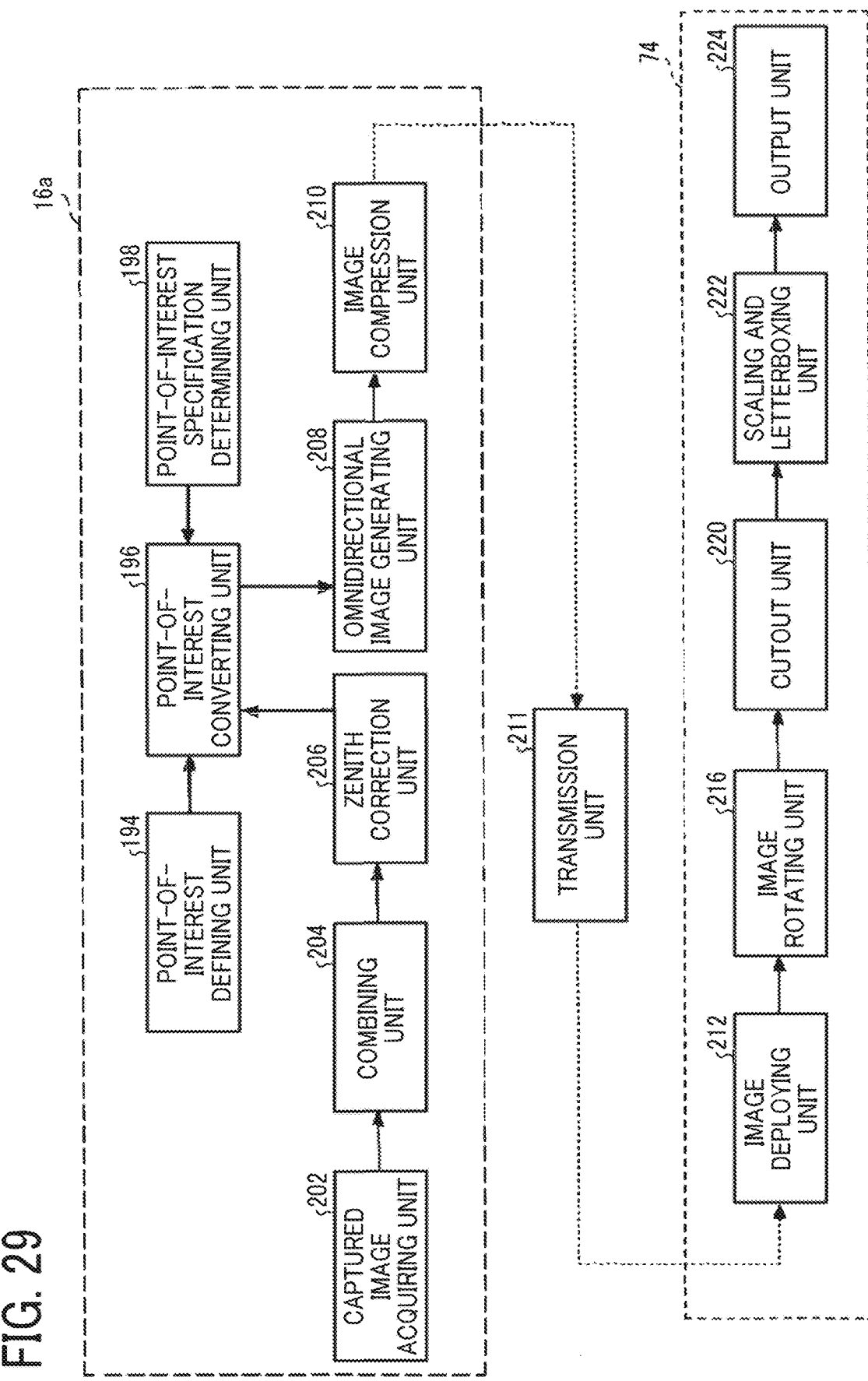
FIG. 29 is a functional block diagram illustrating exemplary functional blocks of an image processing unit of the image capturing device.

FIG. 29 illustrates major fictional blocks of the image processing unit 16*a* of the image capturing device 5*a*. The image processing unit 16*a* includes a captured image acquiring unit 202, a combining unit 204, a zenith correction unit 206, an omnidirectional image generating unit 208, an image compression unit 210, a point-of-interest defining unit 194, a point-of-interest converting unit 196, and a point-of-interest specification determining unit 198.

The captured image acquiring unit 202 controls the two imaging elements 103*a* and 103*b* to acquire therefrom the respective captured images. When the image capturing device 5*a* captures still images, two captured images are acquired for one frame when the shutter button SB is pressed. When the image capturing device 5*a* captures video images, images are sequentially captured in successive frames, and two captured images are acquired for each of the frames. The image captured by each of the imaging elements 103*a* and 103*b* is a fisheye image with a substantially hemispherical field of view, and is a partial image of the omnidirectional image. In the following description, the image captured by each of the imaging elements 103*a* and 103*b* will be occasionally referred to as the partial image.

The combining unit 204 executes a combining position detection process of detecting a combining position for combining the two acquired partial images, to thereby combine the two partial images at the combining position. In the combining position detection process, the combining unit 204 detects, for each frame, respective positional deviation amounts of a plurality of corresponding points in an overlapping area of the partial images.

The point-of-interest defining unit 194 defines and holds the coordinates (x, y) of the point of interest in a planar image. The coordinates of the point of interest are not set by a user (e.g., the photographer 8), but are previously defined (i.e., fixed) in a manufacturing, designing, or shipment process, for example. Plural sets of coordinates may be defined for the point of interest. In this case, the photographer 8 operates the image capturing device 5*a* or the communication terminal 1 to select a desired set of coordinates for the point of interest.

The point-of-interest specification determining unit 198 determines whether the photographer 8 is specifying the point of interest. For example, if a predetermined button of the image capturing device 5a is kept pressed down, the point-of-interest specification determining unit 198 determines that the photographer 8 is specifying the point of interest. If the predetermined button is not kept pressed down, the point-of-interest specification determining unit 198 determines that the photographer 8 is not specifying the point of interest.

Based on the attitude information acquired by the attitude information acquiring unit 15a, the zenith correction unit 206 executes a correction process for adjusting the zenith direction of the omnidirectional image to match a predetermined reference direction. Specifically, the zenith correction unit 206 corrects a later-described conversion table in FIG. 30A. Herein, the predetermined reference direction is typically along the vertical direction in which the acceleration of gravity acts. With the zenith direction of the omnidirectional image corrected to match the vertical direction (i.e., upward direction), the user is prevented from having discomfort such as sickness from watching three-dimensional image, particularly three-dimensional video image, when the field of view is changed during viewing of the image.

Based on the processing results of the point-of-interest defining unit 194 and the point-of-interest specification determining unit 198 and the corrected conversion table, the point-of-interest converting unit 196 converts the coordinates (x, y) of the point of interest in a plane coordinate system (hereinafter referred to as the plane coordinates (x, y)) into the coordinates (θ, φ) of the point of interest in a spherical coordinate system (hereinafter referred to as the spherical coordinates (θ, φ)), That is, the point-of-interest converting unit 196 determines the coordinates of the point of interest subjected to the zenith correction based on the attitude information. The point-of-interest converting unit 196 sets the spherical coordinates (θ, φ) of the point of interest in the point-of-interest information.

TABLE 1 given below illustrates an example of the point-of-interest information.

TABLE 1

|  | unit or value | example |
|---|---|---|
| θ of the point of interest | pixel | 500 |
| φ of the point of interest | pixel | 300 |
| specification or non-specification of the point of interest | specified or unspecified | specified |

The point-of-interest information includes the spherical coordinates (θ, φ) of the point of interest and information of whether the point of interest is specified or unspecified. If the point of interest is specified, the point-of-interest specification determining unit 198 sets a value "specified" in the field of specification or non-specification of the point of interest. If the point of interest is unspecified, the point-of-interest specification determining unit 198 sets a value "unspecified" in the field of specification or non-specification of the point of interest. The point of interest per se is constantly included in the point-of-interest information.

The omnidirectional image generating unit 208 executes a process of generating the omnidirectional image from the two captured partial images with the processing result of the point-of-interest converting unit 196. In the present embodiment, the conversion table is also used to generate the omnidirectional image from the two partial images. The omnidirectional image generating unit 208 generates the omnidirectional image from the two partial images with the corrected conversion table. With this process, a processing load for obtaining the final omnidirectional image is reduced.

The method of generating the omnidirectional image, however, is not limited to the above-described method. For example, the two partial images may be combined to generate an omnidirectional image, and the zenith correction process may be performed on the thus-generated omnidirectional image to generate an omnidirectional image subjected to the zenith correction.

The image compression unit 210 includes a still image compression unit. When the image capturing device 5a captures still images, the image compression unit 210 compresses the captured image into image data in a predetermined still image format such as the joint photographic experts group (JPEG) format. When the image capturing device 5a captures video images, the image compression unit 210 compresses successive frames of the captured image into image data in a predetermined video image format. Video compression formats usable in this case include, but are not limited to, H.264/moving picture experts group (MPEG)-4 advanced video coding (AVC), H.265/high efficiency video coding (HEVC), motion JPEG, and motion JPEG 2000, for example. The generated image data is transmitted to the sites B to D by a transmission unit 211. The transmission unit 211 corresponds to the communication unit 18a of the image capturing device 5a and the transmitting and receiving unit 91 of the communication terminal 1.

Functions of the display control units 94, 74, 34c, and 34d of the communication terminals 1 to 4 will be described.

In response to receipt of an omnidirectional image from another site, the communication terminals 1 to 4 display the omnidirectional image. As illustrated in FIG. 29, the display control unit 74 of the communication terminal 2 includes an image deploying unit 212, an image rotating unit 216, a cutout unit 220, a scaling and letterboxing unit 222, and an output unit 224. Although the functions of the display control unit 74 of the communication terminal 2 will be described below with FIG. 29, the description similarly applies to the display control unit 34c of the communication terminal 3, the display control unit 34d of the communication terminal 4, and the display control unit 94 of the communication terminal 1.

The image deploying unit 212 reads and acquires the omnidirectional image transmitted from the image capturing device 5a, and deploys the acquired omnidirectional image on a memory of the communication terminal 2.

The image rotating unit 216 rotates the omnidirectional image in accordance with the point of interest determined by the point-of-interest converting unit 196. Thereby, the coordinates of the point of interest are moved to the center of the equidistant cylindrical image. A detailed description of the rotation process will be described later with FIG. 32.

The cutout unit 220 cuts out a part (e.g., a central part) of the rotated omnidirectional image to generate a cut-out image. Cutting out a part of an image refers to taking out a certain part of the image, and may also be described as trimming. The cutout unit 220 preferably cuts out a central part of the converted omnidirectional image, to thereby cut out an image corresponding to a part of the omnidirectional image having a certain size and centering around the point of interest.

In the present embodiment, the cutout unit 220 has a function of generating a cut-out image by cutting out a part of an image. As well as this function, the cutout unit 220 may also have a function of reducing the resolution of the image.

The scaling and letterboxing unit 222 executes an enlargement process on the image cut out by the cutout unit 220 in accordance with the resolution and aspect ratio of an image output device (e.g., a display or projector) to which the image is output. The scaling and letterboxing unit 222 further executes a process of adding black bars to the upper and lower sides of the cut-out image to generate an image for display. The output unit 224 outputs (e.g., displays), via an image output interface of the communication terminal 2, the image for display generated through the processing of the scaling and letterboxing unit 222. The processing of the scaling and letterboxing unit 222 may be omitted if the resolution and aspect ratio of the cut-out image match those of the image output device.

In the case of the still image, the image output process by the above-described functional units (i.e., the image rotating unit 216, the cutout unit 220, the scaling and letterboxing unit 222, and the output unit 224) is repeated on the same omnidirectional image at least every time the point of interest changes, or typically at each predetermined time interval, to update the image for display in accordance with the point of interest at the time of the change in the point of interest or at the each predetermined time interval. In the case of the video image, the image output process by the above-described functional units is typically repeated on the omnidirectional image in each of frames to update the image for display.

According to the embodiment, when the photographer 8 tilts or rotates the image capturing device 5a in a certain direction relative to the direction of the image capturing device 5a in the erected state, the point of interest is changed to enable the user to view the omnidirectional image displayed in accordance with the changed point of interest.

The conversion table will be described in more detail with FIGS. 30A and 30B.

Figures 30A, 30B:
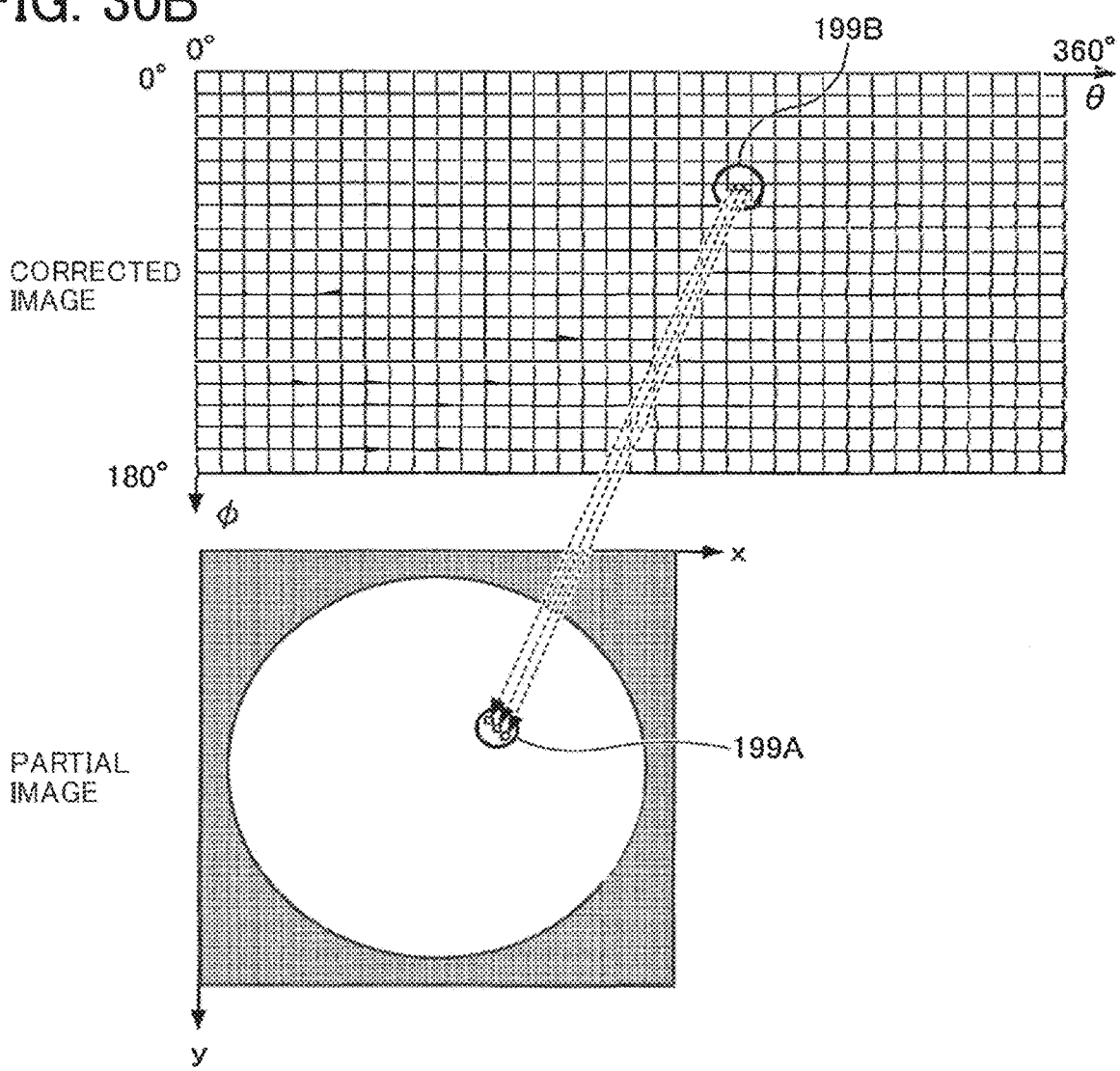
FIG. 30A is a diagram illustrating an example of a conversion table used by the image capturing device.
FIG. 30B is a diagram illustrating an example of conversion from a plane coordinate system into a spherical coordinate system.

FIG. 30A is a diagram illustrating an example of the conversion table. FIG. 30B is a diagram illustrating conversion from a plane coordinate system into a spherical coordinate system. FIG. 30A illustrates a conversion table used by the image capturing device 5a of the embodiment. The conversion table specifies projection of the partial image captured by the imaging element 103a or 103b, which is expressed by the plane coordinates (x, y), to the equidistant cylindrical image expressed by the spherical coordinates (θ, φ) (hereinafter referred to as the corrected image). For each of the fisheye lenses 102a and 102b, the conversion table holds association information for all values of the spherical coordinates (θ, φ). The association information associates the values of the spherical coordinates (θ, φ) of the corrected image with the values of the plane coordinates (x, y) of the pre-correction partial image, which are mapped into the values of the spherical coordinates (θ, φ). In the example illustrated in FIGS. 30A and 30B, the angle of each pixel is 0.1 degrees in both the θ direction and the φ direction, and the conversion table stores information of 3600×1800 corresponding relationships for each of the fisheye lenses 102a and 102b. The original conversion table may be tabulated with values calculated with distortion from an ideal lens model previously corrected by a manufacturer of the image capturing device 5a, for example.

As illustrated in FIG. 30B, coordinates 199A of the point of interest expressed as the plane coordinates (x, y) are projected to the spherical coordinates (θ, φ) based on the conversion table. As viewed from the image capturing device 5a, the direction of the coordinates 199A of the point of interest expressed as the plane coordinates (x, y) is constant. If the conversion table is fixed, therefore, coordinates 199B of the point of interest expressed as the spherical coordinates (θ, φ) are also constant.

However, the attitude of the image capturing device 5a changes depending on how the photographer 8 holds the image capturing device 5a. Therefore, the vertical direction of the actual space and the vertical direction of the corrected image do not match unless the conversion table is corrected in accordance with the attitude information. In the zenith correction, therefore, the conversion table is corrected in accordance with the attitude information.

Figure 31:
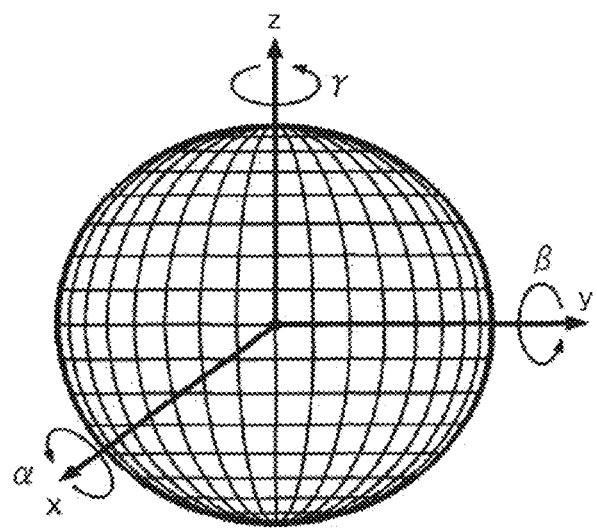
FIG. 31 is a diagram illustrating an example of correction of the conversion table based on attitude information of the image capturing device.

FIG. 31 is a diagram illustrating correction of the conversion table based on the attitude information. Herein, three-dimensional orthogonal coordinates before the coordinate conversion are expressed as (x1, y1, z1), and spherical coordinates of the three-dimensional orthogonal coordinates (x1, y1, z1) are expressed as (θ1, φ1). Further, three-dimensional orthogonal coordinates after the coordinate conversion are expressed as (x2, y2, z2), and spherical coordinates of the three-dimensional orthogonal coordinates (x2, y2, z2) are expressed as (θ2, φ2).

In the process of correcting the conversion table, the spherical coordinates (θ1, φ1) are converted into the spherical coordinates (θ2, φ2) with equations (1) to (6) given below.

[Math. 1]

$$x1 = \sin(\phi 1)\cos(\theta 1) \qquad (1)$$

$$y1 = \sin(\phi 1)\cos(\theta 1) \qquad (2)$$

$$z1 = \cos(\phi 1) \qquad (3)$$

$$\begin{pmatrix} x2 \\ y2 \\ z2 \end{pmatrix} = \begin{pmatrix} 1 & 0 & 0 \\ 0 & \cos\alpha & \sin\alpha \\ 0 & -\sin\alpha & \cos\alpha \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} \cos\gamma & \sin\gamma & 0 \\ -\sin\gamma & \cos\gamma & 0 \\ 0 & 0 & 1 \end{pmatrix} \begin{pmatrix} x1 \\ y1 \\ z1 \end{pmatrix} \qquad (4)$$

$$\phi 2 = \text{Arc }\cos(z2) \qquad (5)$$

$$\theta 2 = \text{Arc }\tan\left(\frac{y2}{x2}\right) \qquad (6)$$

To perform rotational transformation with three-dimensional orthogonal coordinates, a process of converting the spherical coordinates (θ1, φ1) into the three-dimensional orthogonal coordinates (x1, y1, z1) is first executed with equations (1) to (3).

Then, based on equation (4), the three-dimensional orthogonal coordinates (x1, y1, z1) are converted into the three-dimensional orthogonal coordinates (x2, y2, z2) with the rotation angles α, β, and γ (i.e., the attitude information) of the image capturing device 5a that points at the object. Equation (4) indicates that the original coordinates are rotated around the X-axis by the rotation angle α, rotated around the Y-axis by the rotation angle β, and rotated around the Z-axis by the rotation angle γ to obtain the post-conversion coordinates.

Finally, the post-conversion three-dimensional orthogonal coordinates (x2, y2, z2) are converted back to the spherical coordinates (θ2, φ2) with equations (5) and (6). The coordinates (θ1, φ1) represent the pre-correction spherical coordinates of the conversion table, and the spherical coordinates (θ1, φ1) of the conversion table are corrected to (θ2, φ2) in accordance with the attitude information of the image capturing device 5a.

With the corrected conversion table, the point-of-interest converting unit 196 converts the plane coordinates of the point of interest into the spherical coordinates of the point of interest. Thereby, the spherical coordinates of the point of interest subjected to the zenith correction are obtained.

The image rotation process of the image rotating unit 216 will be described with FIG. 32.

FIG. 32*a* is a diagram schematically illustrating the image rotation process of the image rotating unit 216. Image rotation refers to a process of moving the spherical coordinates of the point of interest to the center of the image. Herein, new coordinates obtained through the image rotation are expressed as ($\theta_N$, $\varphi_N$), and the coordinates of the point of interest are expressed as ($\theta_0$, $\varphi_0$). Further, given coordinates to be rotated are expressed as ($\theta$, $\varphi$). With equations (7) and (8) given below, the coordinates of the point of interest are moved to the center of the image.

[Math. 2]

$$\theta_N = \theta - \theta_0 + 180° \ (\theta - \theta_0 \leq 180°) \quad (7)$$
$$= \theta - \theta_0 - 180° \ (\theta - \theta_0 > 180°)$$

$$\varphi_N = \varphi - \varphi_0 + 90° \ (\varphi - \varphi_0 \leq 90°) \quad (8)$$
$$= \varphi - \varphi_0 - 90° \ (\varphi - \varphi_0 > 90°)$$

Figure 32:
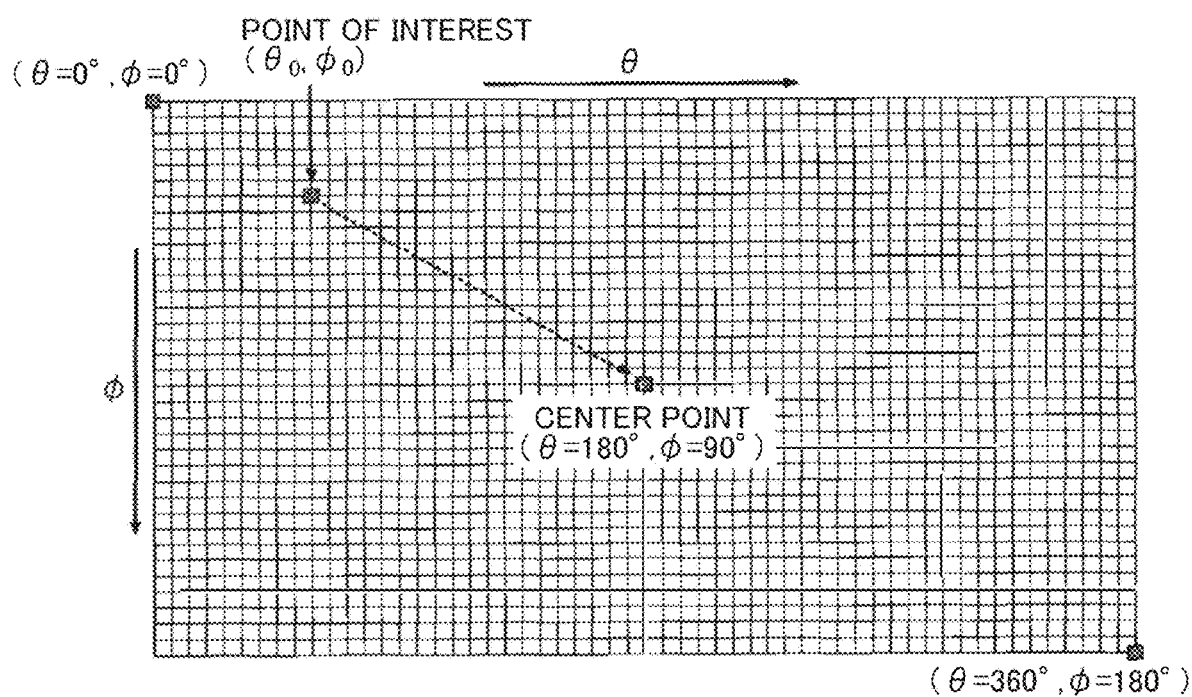
FIG. 32 is a diagram schematically illustrating an example of an image rotation process executed by an image rotating unit of the image capturing device.

With equations (7) and (8), a given pixel is rotated (i.e., moved) by the difference between the coordinates of a center point and the coordinates of the point of interest in the $\theta$ direction and the $\varphi$ direction, as indicated by a broken arrow in FIG. 32.

Figure 33:
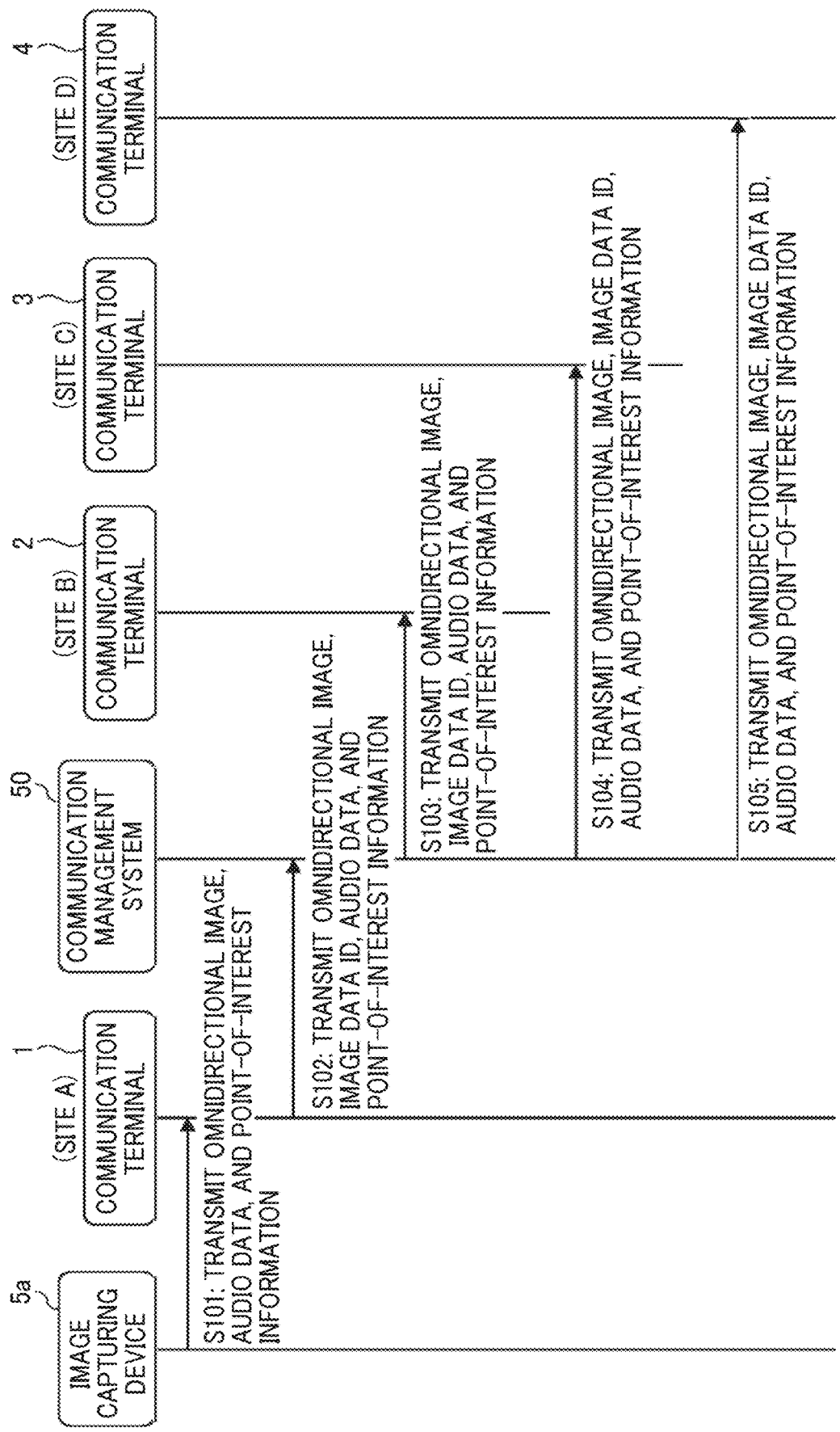
FIG. 33 is a sequence diagram illustrating an exemplary process of communicating an omnidirectional image and audio data in a video call in the image communication system.

With reference to FIG. 33 a description will be given of a procedure of a process of transmitting the omnidirectional image and the audio data obtained at the site A to the communication terminals 2 to 4 via the communication management system 50.

FIG. 33 is a sequence diagram illustrating an exemplary procedure of a process of communicating the omnidirectional image and the audio data in a video call. The communication unit 18*a* of the image capturing device 5*a* first transmits the omnidirectional image and the audio data to the communication unit 98 of the communication terminal 1 (step S101). The omnidirectional image is obtained from the captured image of a subject (e.g., an object or surroundings). The audio data is obtained from collected sounds. In this step, the image capturing device 5*a* attaches the point-of-interest information to the omnidirectional image irrespective of the result of determination by the point-of-interest specification determining unit 198. Then, the communication unit 98 of the communication terminal 1 receives the omnidirectional image and the audio data.

Then, the transmitting and receiving unit 91 of the communication terminal 1 transmits to the communication management system 50 the omnidirectional image, the audio data, and the point-of-interest information transmitted from the image capturing device 5*a* (step S102). The image data ID for identifying the captured image data of the omnidirectional image to be transmitted is also transmitted in this step. Then, the transmitting and receiving unit 51 of the communication management system 50 receives the omnidirectional image with the image data ID, the audio data, and the point-of-interest information.

Then, the transmitting and receiving unit 51 of the communication management system 50 transmits, to the communication terminals 2 to 4 participating in the video call participated in by the communication terminal 1, the omnidirectional image with the image data ID, the audio data, and the point-of-interest information (steps S103, S104, and S105). The image data ID transmitted here is for identifying the omnidirectional image to be transmitted. Then, the transmitting and receiving unit 71 of the communication terminal 2, the transmitting and receiving unit 31*c* of the communication terminal 3, and the transmitting and receiving unit 31*d* of the communication terminal 4 receive the omnidirectional image with the image data ID, the audio data, and the point-of-interest information. Normally, the communication terminal 1 also receives the omnidirectional image of the site A from the communication management system 50 and displays the omnidirectional image, although illustration thereof is omitted in FIG. 33.

With FIGS. 34A and 34B, a detailed description will be given of a process of generating the omnidirectional image performed by the image capturing device 5*a* and the process of displaying the omnidirectional image performed by the communication terminals 2 to 4.

Figure 34A:
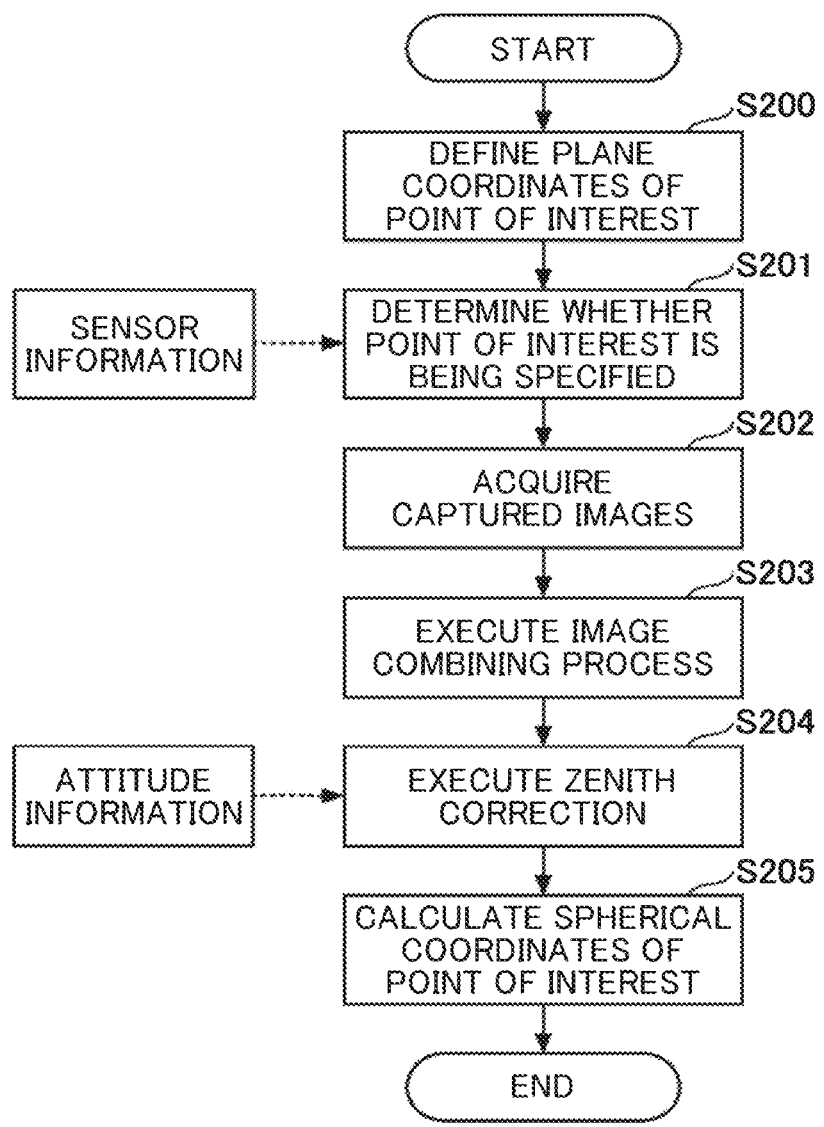
FIG. 34A is a flowchart illustrating an exemplary process of generating the omnidirectional image performed by the image capturing device.

FIG. 34A is a flowchart illustrating an exemplary process of generating the omnidirectional image performed by the image capturing device 5*a*. FIG. 34B is a flowchart illustrating an exemplary process of displaying the omnidirectional image performed by the communication terminals 2 to 4. In FIG. 34A, which illustrates a process of the image capturing device 5*a*, illustration of the communication terminal 1 is omitted.

The point-of-interest defining unit 194 defines the plane coordinates of the point of interest (step S200). As described above with FIG. 29, the plane coordinates of the point of interest are statically preset.

During an image capturing process, the point-of-interest specification determining unit 198 determines, based on sensor information, whether the photographer 8 is specifying the point of interest (step S201). The sensor information refers to information indicating whether pressing of a predetermined button of the image capturing device 5*a* has been detected. When pressing of the predetermined button is detected, the point-of-interest specification determining unit 198 determines that the point of interest is specified. When the point of interest is specified, the point-of-interest specification determining unit 198 sets the value "specified" in the field of specification or non-specification of the point of interest in TABLE 1.

The captured image acquiring unit 202 acquires the captured images from the imaging elements 103*a* and 103*b* (step S202).

Then, the combining unit 204 detects the combining position in the overlapping area of the two acquired partial images, and reflects a result of detection of the combining position in the conversion table (step S203), With the result of detection of the combining position, the conversion table illustrated in FIG. 30A is corrected such that the values of the plane coordinates (x, y) of the partial images reflecting the correction of the combining position are associated with the values of the spherical coordinates ($\theta$, $\varphi$) of the corrected image.

The zenith correction unit 206 corrects the conversion table based on the attitude information (step S204). That is, the zenith correction unit 206 executes the zenith correction.

With the corrected conversion table, the point-of-interest converting unit 196 then converts the plane coordinates of the point of interest defined by the point-of-interest defining unit 194 into the spherical coordinates of the point of interest (step S205). The point-of-interest converting unit 196 further sets, in the point-of-interest information in TABLE 1, the spherical coordinates of the point of interest obtained through the conversion. The coordinates of the point of interest are also set in the point-of-interest information when it is determined at step S201 that the point of interest is unspecified. Alternatively, the coordinates of the point of interest may not be set in the point-of-interest information when it is determined at step S201 that the point of interest is unspecified.

The omnidirectional image and the point-of-interest information generated through the above-described process are transmitted to the communication terminals 2 to 4, as described above with FIG. 33.

Figure 34B:
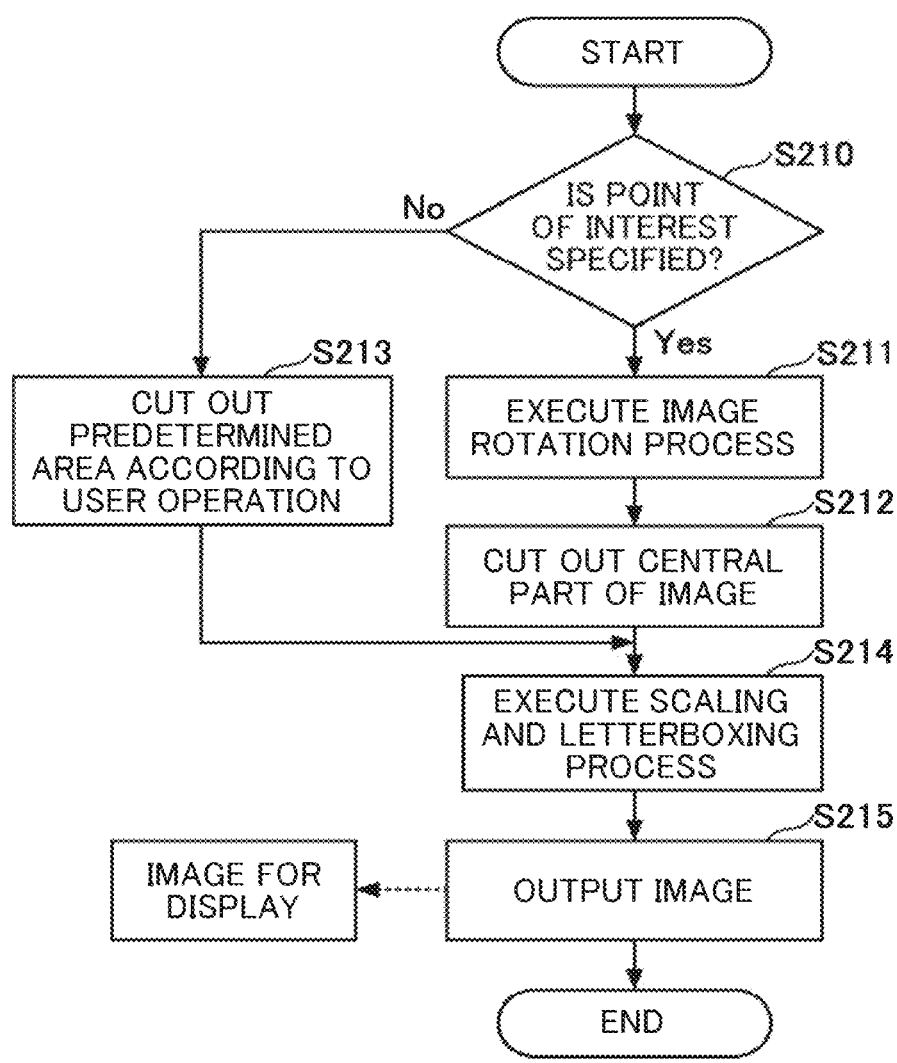
FIG. 34B is a flowchart illustrating an exemplary process of displaying the omnidirectional image performed by the communication terminals of the image communication system.

FIG. 34B is a flowchart illustrating a process performed by each of the display controlling units 74, 34c, and 34d of the communication terminals 2, 3 and 4. The image rotating unit 216 first determines whether the point of interest is "specified" in the point-of-interest information attached to the omnidirectional image (step S210).

If the point of interest is "specified" in the point-of-interest information (Yes at step S210), the image rotating unit 216 rotates the omnidirectional image such that the point of interest is positioned at the center of the equidistant cylindrical image (step S211). Thereby, the point of interest is forcibly displayed irrespective of the predetermined area image displayed by the communication terminal 2, 3, or 4 until the receipt of the point-of-interest information indicating that the point of interest is specified.

Then, the cutout unit 220 cuts out a central part of the omnidirectional image to generate a cut-out image (step S212). The size of the image to be cut out from the omnidirectional image is previously determined. In the example of FIG. 8, the center point CP corresponds to the coordinates of the point of interest, and the angle of view α and the distance f are previously determined.

If the point of interest is "unspecified" in the point-of-interest information (No at step S210), the omnidirectional image may be rotated as desired by the user of the communication terminal 2, 3, or 4. If the omnidirectional image is a still image, the predetermined area T generated based on the last user operation of rotating the omnidirectional image is displayed. If the omnidirectional image is a video image, the predetermined area T generated based on the last user operation of rotating the omnidirectional image is kept displayed. The cutout unit 220 cuts out the predetermined area T determined based on the user operation (step S213).

The scaling and letterboxing unit 222 enlarges the cut-out image in accordance with the resolution and aspect ratio of the image output device to which the image is output, and adds black bars to the enlarged image, to thereby generate an image for display (step S214).

The output unit 224 outputs the generated image for display to the image output device via the image output interface (step S215).

An example of display of the image on a communication terminal will be described.

Figure 35:
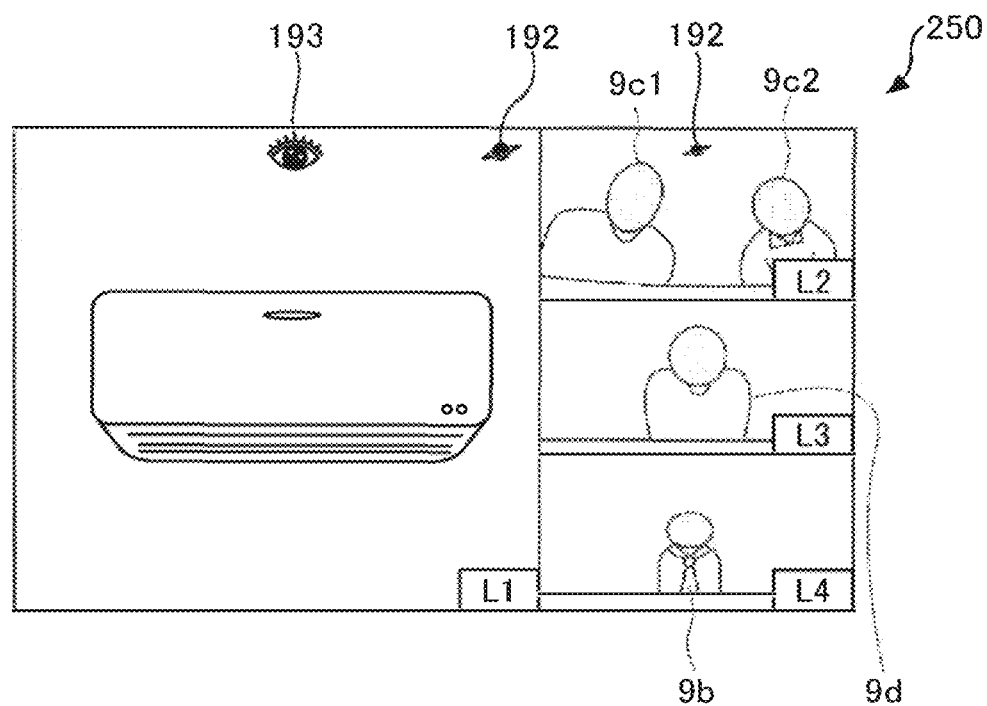
FIG. 35 is a diagram illustrating an example of an image display screen displayed on a display of a communication terminal of the image communication system.

FIG. 35 illustrates an example of an image display screen 250 displayed on the display 917 of the communication terminal 2 at the site B. A left display area L1 of the image display screen 250 displays the omnidirectional image of the site A. An upper-right display area L2 of the image display screen 250 displays the omnidirectional image of the site C. A middle-right display area L3 of the image display screen 250 displays the image of the site D. A lower-right display area L4 of the image display screen 250 displays the image of the site B, at which the communication terminal 2 is located. The display area L1 is a main display area, and the display areas L2 to L4 are sub-display areas. Each of the communication terminals 1 to 4 is capable of switching the image of the main display area to one of the images of the sub-display areas. At each of the sites A to D, the main display area normally displays the image of the site at which a keyperson of the video call is located.

The display areas L1 and L2 display an omnidirectional image icon 192. The omnidirectional image icon 192 indicates that the image displayed in the corresponding display area is the omnidirectional image. The user 9b of the communication terminal 2 is able to change the predetermined area T. The display area L1 further displays a point-of-interest icon 193. The point-of-interest icon 193 is displayed by the display control unit 74 when the point of interest is specified in the point-of-interest information. The point-of-interest icon 193 indicates that the point of interest is specified. The point-of-interest icon 193 is an example of a message indicating that the point of interest is specified. Thereby, the user 9b understands that the point of interest is currently displayed, and that the predetermined area T is not allowed to be changed.

That the predetermined area T is not allowed to be changed means that the receiving unit 72 does not accept a change in the predetermined area T displayed in the display area, or that the receiving unit 72 accepts a change in the predetermined area T displayed in the display area, but when the user 9b stops the operation of changing the predetermined area T displayed in the display area, the point of interest converted by the point-of-interest converting unit 196 is cut out from the omnidirectional image by the cutout unit 220 and displayed again. For example, the user 9b is able to display a desired predetermined area T in the display area while dragging the predetermined area T with a mouse of the communication terminal 2 kept clicked on the predetermined area T or while swiping the predetermined area T with a finger of the user 9b kept touched on the predetermined area T.

Alternatively, the user 9b may be allowed to stop the display of the point of interest. In this case, the communication terminal 2 is equipped with a predetermined button, for example. When the user 9b presses the predetermined button once, the display of the point of interest stops, allowing the user 9b to display a desired predetermined area T. Further, when the user 9b presses the predetermined button again, the point of interest is automatically displayed.

According to the embodiment, video communication between multiple sites is possible, as illustrated in FIG. 35. Therefore, when the users 9b and 9d know each other but are unable to visit a real estate property for viewing or visit a real estate agency together, for example, the users 9b and 9d are able to experience realistic viewing. When the users 9b and 9d are a couple and one of the users 9b and 9d is unable to visit the real estate agency, for example, the users 9b and 9d are able to see and comment on the same property from the different sites B and D.

As described above, according to the image communication system 10 of the embodiment, the coordinates of the point of interest are previously defined in the image capturing device 5a. The photographer 8 points the image capturing device 5a at the target object such that the coordinates of the point of interest are aligned with the target object. With the image capturing device 5a alone, therefore, the photographer 8 is able to draw the attention of a user at a different site to the point of interest in real time.

In the above-described embodiment, a description has been given of an example in which the image communication system 10 is used in viewing of real estate properties. However, the application of the image communication system 10 is not limited to this example. The image communication system 10 is also applicable to other situations in which an object at a given site is pointed with the image capturing device 5*a*, such as an exhibition, a show, a factory tour, sightseeing, and an inspection, for example.

In the above-described embodiment, the object is pointed by a person with the image capturing device 5*a*. Alternatively, the object may be pointed by a machine, robot, or animal. For example, the image capturing device 5*a* may be fixed to the front side in the traveling direction of a movable machine to constantly display the image of an object present in front of the machine in the traveling direction, and if necessary, the image may be rotated to check the surroundings of the machine. In this case, switching between display and non-display of the coordinates of the point of interest may be performed by a device or apparatus that receives the omnidirectional image.

Further, in the above-described embodiment, the point of interest is displayed as a part of the omnidirectional image, for example. However, the omnidirectional image is not necessary required to be a 360-degree surrounding image. For example, a single hemispherical image may be captured, or the direction of capturing the 360-degree image may be limited to the horizontal direction. Further, a planar image with more pixels than the number of pixels covered by one display may be used.

The blocks in the exemplary configurations illustrated in drawings such as FIGS. 15A to 16B and FIG. 29 are divided in accordance with major functions of the image communication system 10 to facilitate the understanding of the processing of the image communication system 10. The present invention is not limited by how the processing units are divided or the names of the processing units. The processing of the image communication system 10 may be divided into a larger number of processing units depending on processes to be performed. Further, a processing unit of the image communication system 10 may be sub-divided to include more processes.

The image communication system 10 may include a plurality of communication management systems 50. Further, the functions of the communication management system 50 may be dividedly allocated to a plurality of servers. Further, the image communication system 10 may include a relay device that relays the image data and the audio data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A communication terminal at a first site, the communication terminal comprising:
    circuitry configured to
        receive a spherical image captured by another communication terminal, which is not at the first site;
        determine whether a point of interest is specified by the other communication terminal;
        control, in a case that the circuitry determines that the point of interest is specified by the other communication terminal, a display to forcibly display a first image including the point of interest and to prohibit change of display away from the first image; and
        control, in a case that the circuitry determines that the point of interest is not specified by the other communication terminal, the display to display a second image including a predetermined area of the spherical image based on a user operation on the communication terminal at the first site.

2. The communication terminal of claim 1, wherein the circuitry is further configured to control the display to display an icon based on the point of interest in the case that the point of interest is specified by the other communication terminal.

3. The communication terminal of claim 1, wherein the circuitry is further configured to rotate the spherical image such that the point of interest is displayed by the display at a center of the first image.

4. The communication terminal of claim 1, wherein the circuitry is further configured to, after the first image is displayed in the case that point of interest is specified by the other communication terminal:
    receive a user input at the communication terminal to change a viewable area of the spherical image, the viewable area being a part of the spherical image and including the point of interest;
    control the display to display, based on the user input, an adjusted image having an adjusted viewable area while the user input is received; and
    control, after reception of the user input has stopped, the display to revert display back to the first image of the viewable area.

5. The communication terminal of claim 1, wherein the circuitry is further configured to, after the first image is displayed in the case that point of interest is specified by the other communication terminal:
    receive a predetermined operation at the communication terminal; and
    in response to reception of the predetermined operation, control the display to stop display of the first image.

6. A communication method for a communication terminal at a first site, the communication method comprising:
    receiving a spherical image captured by another communication terminal, which is not at the first site;
    determining whether a point of interest is specified by the other communication terminal;
    displaying, in a case that the determining indicates that the point of interest is specified by the other communication terminal, a first image including the point of interest and prohibiting change of display away from the first image; and
    displaying, in a case that the determining indicates that the point of interest is not specified by the other communication terminal, a second image including a predetermined area of the spherical image based on a user operation on the communication terminal at the first site.

7. The communication method of claim 6, further comprising displaying an icon based on the point of interest in the case that the point of interest is specified by the other communication terminal.

8. The communication method of claim 6, further comprising rotating the spherical image such that the point of interest is at a center of the first image.

9. The communication method of claim 6, further comprising, after the first image is displayed in the case that point of interest is specified by the other communication terminal:
- receiving a user input at the communication terminal to change a viewable area of the spherical image, the viewable area being a part of the spherical image and including the point of interest;
- displaying, based on the user input, an adjusted image having an adjusted viewable area while the user input is received; and
- reverting, after reception of the user input has stopped, display back to the first image of the viewable area.

10. The communication method of claim 6, further comprising, after the first image is displayed in the case that point of interest is specified by the other communication terminal:
- receiving a predetermined operation at the communication terminal; and
- stopping, in response to reception of the predetermined operation, display of the first image.

11. The communication terminal of claim 1, wherein the other communication terminal is an image capturing device.

12. The communication terminal of claim 1, wherein the circuitry is further configured to, in the case that the circuitry determines that the point of interest is not specified by the other communication terminal, rotate the spherical image according to the user operation.

13. The communication terminal of claim 1, wherein the other communication terminal is located at a second site which is not the first site.

14. The communication terminal of claim 1, wherein the circuitry prohibits the change of the display away from the first image by disregarding a user input received at the communication terminal at the first site to change from displaying the first image.

15. The communication method of claim 6, wherein the prohibiting the change includes disregarding a user input received at the communication terminal at the first site to change from displaying the first image.

* * * * *